(12) United States Patent
Gabbita et al.

(10) Patent No.: US 6,349,238 B1
(45) Date of Patent: Feb. 19, 2002

(54) SYSTEM AND METHOD FOR MANAGING THE WORKFLOW FOR PROCESSING SERVICE ORDERS AMONG A VARIETY OF ORGANIZATIONS WITHIN A TELECOMMUNICATIONS COMPANY

(75) Inventors: Swathibabu Gabbita, Vienna; Brandon Goldfedder, Reston, both of VA (US); Casey K. Hopson, Ellicott City, MD (US); Robert E. Park, Germantown, MD (US); Dennis Troup, Germantown, MD (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/154,233

(22) Filed: Sep. 16, 1998

(Under 37 CFR 1.47)

(51) Int. Cl.[7] ............................................... G06F 19/00
(52) U.S. Cl. ...................... 700/101; 700/100; 700/102
(58) Field of Search .............................. 700/101, 100, 700/102, 103, 149, 108

(56) References Cited

U.S. PATENT DOCUMENTS

| | | | | |
|---|---|---|---|---|
| 5,233,534 A | * | 8/1993 | Osthus et al. | 364/468 |
| 5,870,545 A | * | 2/1999 | Davis et al. | 395/200.31 |
| 5,903,877 A | * | 2/1999 | Berkowitz et al. | 705/26 |
| 6,058,334 A | * | 5/2000 | Shapiro | 700/97 |
| 6,073,109 A | * | 6/2000 | Flores et al. | 705/8 |
| 6,115,640 A | * | 9/2000 | Tarumi | 700/99 |

* cited by examiner

Primary Examiner—Robert Beausoleil
Assistant Examiner—Tim Vo

(57) ABSTRACT

A system and method for managing the workflow for processing Service Orders among a variety of organizations within a telecommunications company. The system and method coordinates all of the tasks and activities related to order processing among the various entities within the telecommunications company. Workflows are used to model business procedures used for processing Service Orders. Each workflow comprises a plurality of workflow steps. Business process models are depicted as workflow diagrams. Upon receipt of a Service Order, an appropriate Work Plan is selected based on information within the Service Order. Each workflow step is assigned a Resource and is scheduled for completion. The Workflow steps are then placed in In-boxes associated with the selected Resource. Once the processing steps have been scheduled, a current work step is calculated. Notification messages are sent to the appropriate systems to notify them to begin activity associated with the current work step. The system is automatically notified when the current work step is complete, so that the next work step can be processed in a similar fashion. Detailed statistical information is maintained for audit and reporting purposes. Users log-on to remote workstations coupled with a company-wide Intranet or the like. From the remote workstations, users from various organizations view their In-boxes and other detailed information about Service Orders according to selectable requests. Workflow steps can be transferred and re-assigned using the remote workstations. Detailed statistical information is maintained for audit and reporting purposes. Reports reflecting the effectiveness of workforce management and work administration is obtained.

34 Claims, 8 Drawing Sheets

FIG. 4

| Step # | Step Name | Prop Name | Prop Resource | System | Step # Preceeded by | Prop Automated | Prop Flow Name | Prop Activity Type | Prop Transport Method |
|---|---|---|---|---|---|---|---|---|---|
| 1 | Start | | auto | SRMS | | | LSONNNAD | add | on net |
| 2 | OE Enter Order Into SRMS | OE Enter Order Into SRMS | NSPS | NSPS | 1 | yes | | | |
| 3 | NOTIFY NSPS | NOTIFY_NSPS | TSI | LSAT | 2 | yes | | | |
| 4 | TSI Review Order | TSI Review Order | OE | LSAT | 2 | no | | | |
| 5 | OE Reserve Number in NRM | OE Reserve Number in NRM | TPS | TPS | 2 | no | | | |
| 6 | NOTIFY TPS | NOTIFY TPS | LSP | NSPS | 3 | yes | | | |
| 7 | LSP Review, Accept/Reject SO | NSPS_PROV_APPROVE | LST | TPS | 6 | yes | | | |
| 8 | LST Review, Accept/Reject SO | TPS_GET_SO | OC | LSAT | 2 | no | | | |
| 9 | OC Review, Accept/Reject SO | OC Review, Accept/Reject SO | LSP | NSPS | 4,5,7,8,9 | yes | | | |
| 10 | LSP Review Facilities/Create FOC | NSPS_FIRM_ORDER_DELIVERY_DATE | SRMS | SRMS | 10 | yes | | | |
| 11 | SRMS NOTIFY FOC | SRMS_NOTIFY_FOC | LSAT | LSAT | 10 | yes | | | |
| 12 | LSAT NOTIFY FOC | LSAT_NOTIFY_FOC | OC | LSAT | 11,12 | no | | | |
| 13 | OC All Work Done | OC_ALL_WORK_DONE | OE | LSAT | 13 | no | | | |
| 14 | OE Number Working in NRM | OE Number Working in NRM | LSP | NSPS | 11,12 | yes | | | |
| 15 | LSP Create LEN/PORT & Routing Assignments | NSPS_CREATE_ROUTING_ASSIGNMENTS | TPS | TPS | 15 | yes | | | |
| 16 | TPS READY TO ASSIGN | TPS_READY_TO_ASSIGN | LST | TPS | 16 | yes | | | |
| 17 | LST Complete Switch Translations | TPS_COMPLETE_TRANSLATIONS | LSP | NSPS | 17 | yes | | | |
| 18 | LSP Prov Complete | NSPS_PROV_COMPLETE | OPS | NSPS | 18 | yes | | | |
| 19 | OPS Review, Accept/Reject SO | NSPS_OPS_APPROVE | TSI | LSAT | 18 | no | | | |
| 20 | TSI Complete | TSI Complete | OPS | NSPS | 19,20 | yes | | | |
| 21 | OPS Test to Demarc | NSPS_OPS_TEST_TO_DEMARC | SRMS | SRMS | 21 | yes | | | |
| 22 | NOTIFY SRMS | NOTIFY_SRMS | OPS | NSPS | 22 | yes | | | |
| 23 | OPS Complete Customer Committed Date | NSPS_CUSTOMER_COMMITTED_DATE | auto | | | yes | | | |
| 24 | Order Complete | ORDER_COMPLETE | TPS | TPS | 14,23 | yes | | | |
| 25 | NOTIFY TPS REWORK | REWORK_TPS_GET_SO | LSP | NSPS | 19 | yes | | | |
| 26 | LSP REWORK Prov Complete | NSPS_REWORK_PROV_COMPLETE | LST | TPS | 19 | yes | | | |
| 27 | LST REWORK Accept/Reject SO | REWORK_TPS_ACCEPT_SO | TPS | TPS | 25 | yes | | | |
| 28 | TPS REWORK READY TO ASSIGN | REWORK_TPS_READY_TO_ASSIGN | LST | TPS | 26,27 | yes | | | |
| 29 | LST REWORK Complete Switch Translations | REWORK_TPS_COMPLETE_TRANSLATIONS | LST | TPS | 28 | yes | | | |
| 30 | REJECT | REJECT | auto | | | | | | |
| | NSPS REJECT | NSPS REJECT | NSPS | NSPS | 30 | yes | | | |
| | TPS REJECT | TPS REJECT | TPS | TPS | 30 | yes | | | |
| | SRMS REJECT | SRMS REJECT | SRMS | SRMS | 30 | yes | | | |

SYSTEM AND METHOD FOR MANAGING THE WORKFLOW FOR PROCESSING SERVICE ORDERS AMONG A VARIETY OF ORGANIZATIONS WITHIN A TELECOMMUNICATIONS COMPANY

BACKGROUND OF THE INVENTION

1. Field of the Invention

The present invention relates generally to a workflow management system for a telecommunications corporation and more particularly to a workflow management system for managing and tracking new telecommunications Service Orders from order entry through provisioning and testing.

2. Related Art

Processing telecommunication Service Orders, from the time they are requested by customers, to the time they are implemented in the network, is an intricate and complicated process involving numerous activities that must be completed by various groups within a telecommunications company. Generally, many of these activities depend on one another in that they cannot begin until others are completed. This interdependency between workflow activities and the various telecommunication organizations, make it difficult to process telecommunication Service Orders in an economical and efficient manner.

Conventionally, processing telecommunication Service Orders is largely a manual process where Service and Work Orders (collectively and individually referred to as orders), are manually transferred from one organization to the next as tasks are completed. The transfer of these orders is generally accomplished via internal mail, facsimile, electronic messages and the like. Typically, such organizations receive little or no advance notice about orders before they arrive, and therefore have little or no time to plan and prepare for the activities involved.

Further, if an order is held up in an organization, for one reason or another, it is difficult to determine the reasons for delay and the identity of the group which is responsible for the delay. Often, telecommunication companies only find out about a delay when customers complain that a service has not been installed by the Customer Committed Due Date. Clearly, when this occurs it is too late to maintain customer satisfaction.

Therefore, what is needed is an efficient and economical system and method for processing telecommunication orders and for managing and tracking the workflow associated with processing orders for telecommunication services.

SUMMARY OF THE INVENTION

Accordingly, the present invention provides a system and method for managing the workflow associated with processing Service Orders for a telecommunications company. The present invention provides a focal point for the various organizations within the telecommunications company. A central location is provided processing orders, viewing status, and for the dissemination of information to the various organizations within the company. Such organizations include for example, service provisioning, order control, field operations, and business/management groups. In addition, other organizations, both inside and outside the telecommunications company, can access information pertaining to outstanding Service Orders.

The present invention provides a means to coordinate all of the tasks and activities related to order processing among the various entities within the telecommunications company. When a task associated with a Service Order is ready to begin, notification is sent to the appropriate computer systems associated with the task. Similarly, when the task is complete, the system is automatically notified, so that the next task can begin. The present invention provides a means for organizations to view current status for Service Orders, even before they are notified to begin activities associated with the Service Order. In this fashion, telecommunication personnel can plan ahead and prepare for future activities.

The present invention monitors activities for task completion status and maintains accountability of order status. In this fashion, if an order is delayed, the telecommunication company employees can immediately determine the cause of the delay so that corrective action can be taken before the delay becomes critical.

A primary feature of the present invention is to monitor and control the processing of orders. In addition, the present invention records related processing information and reports on the status of orders as they traverse through the various computer systems of the telecommunications company.

Work Plans are used to model business procedures used for processing Service Orders. Each Work Plan comprises a plurality of workflow steps. Business process models are depicted as workflow diagrams. The workflow diagrams are stored in a library in a database. Work Plans comprising a plurality of workflow steps and associated data are derived from information found in the workflow diagrams.

Whenever a Service Order is received the present invention selects the appropriate Work Plan to process that order based on information contained within the Service Order itself. Each workflow step is assigned a Resource and is scheduled for completion. The workflow steps are then placed within in-boxes associated with the assigned Resource. Once the processing steps have been scheduled, a current work step is calculated. Resources are individuals, groups and/or computer systems Once the processing steps have been scheduled for a Service Order, the present invention monitors each work step throughout the process, communicates with the appropriate systems to notify them of pending work, and records detailed statistical information for audit and reporting purposes. Information exchange is preferably accomplished through messaging.

The primary features of a preferred embodiment of the present invention include:

Receipt of work requests;

Prioritization, scheduling, and work assignment;

Resource allocation according to defined parameters;

Coordination and tracking of work execution;

Completion and close out of work steps;

Management reports reflecting the effectiveness of the workforce management and work administration processes; and Management of the interfaces to the various systems and other processes that depend on an embodiment of the present invention.

Once a workflow step is made current, notification messages are sent to the appropriate systems to notify them to begin the activity associated with the current workflow step. The system is then automatically notified when the current work step is completed, so that the next work step can be processed in a similar fashion. Detailed statistical information is maintained for audit and reporting purposes.

Users can log-on to remote workstations attached to a company-wide Intranet or the like. From the remote workstations, users from various organizations can view their in-boxes and other information about current Service Orders. Such information includes detailed information about the Service Orders including, progress data, current, future and past workflow step data, responsible groups, computer systems and organizations, whether schedules are maintained, and whether Jeopardy points have been missed.

If a Service Order is delayed, users can immediately determine information about the delay and take corrective action before it becomes critical. Workflow steps can be transferred and re-assigned using the remote workstations. Detailed statistical information is maintained for audit and reporting purposes. Reports reflecting the effectiveness of workforce management and work administration is obtained.

In addition, the present invention provides system administrative functions such as system reports, history file and control, and system security.

BRIEF DESCRIPTION OF THE FIGURES

The present invention is described with reference to the accompanying drawings, wherein:

FIG. 4 depicts a tabular representation of the Workflow Diagram presented in FIG. 3, according to a preferred embodiment of the present invention;

DETAILED DESCRIPTION OF THE PREFERRED EMBODIMENTS

The present invention is directed toward a workflow management system for a telecommunications company. An example embodiment of the present invention is referred to herein as "LSAT", which stands for "Local Services Activity Tracker." The examples presented herein are described in terms of a long distance service provider, or interexchange carrier (IXC), using LSAT to process Service Orders for local telecommunication services. The present invention is presented in these terms for convenience only, to particularly point out and describe the details of the present invention in a preferred environment. The present invention is equally applicable to other embodiments. For example, an embodiment of the present invention can be used by IXCs to process orders for long distance telecommunication services. Similarly, alternative embodiments of the present invention can be used by local exchange carriers (LECs) for processing orders for local and/or long distance telecommunication services. Many other variations are also possible. As such, the examples used herein should not be construed to limit the scope and breadth of the present invention.

The table below lists acronyms and abbreviations used to describe the present invention.

TABLE 1

Terms and Acronyms

| | |
|---|---|
| ASP | Access Service Provisioning |
| ASR | Access Service Request |
| CCDD | Customer committed due date |
| CRDD | Customer requested delivery date |
| DTE | Database Translations Engineer |
| ISD | Information Systems Development |
| LEC | Local Exchange Carrier |
| LSAT | Local Service Activity Tracker |
| LSC | Local Service Consultant |
| LSP | Local Service Provisioning |
| LST | Local Service Translations |
| MACD | Moves, Adds, Changes and Disconnects |
| NSPS | Network and Services Provisioning System |
| NRM | Number Reservation Manager |
| OC | Order Coordination |
| OE | Order Entry |
| Ops | Field Operations |
| PON | Purchase Order Number |
| SO | Service Order |
| SON | Service Order Number |
| SRMS | Service Request Management System |
| TPS | Translations Provisioning System |
| TSI | Construction |
| WFD | Workflow Diagram |
| WFM | Workflow Manager |
| WO | Work Order |
| WP | Work Plan |
| WS | Work Step |

DESCRIPTION OF A PREFERRED EMBODIMENT

Example Environment

Figure 1A:
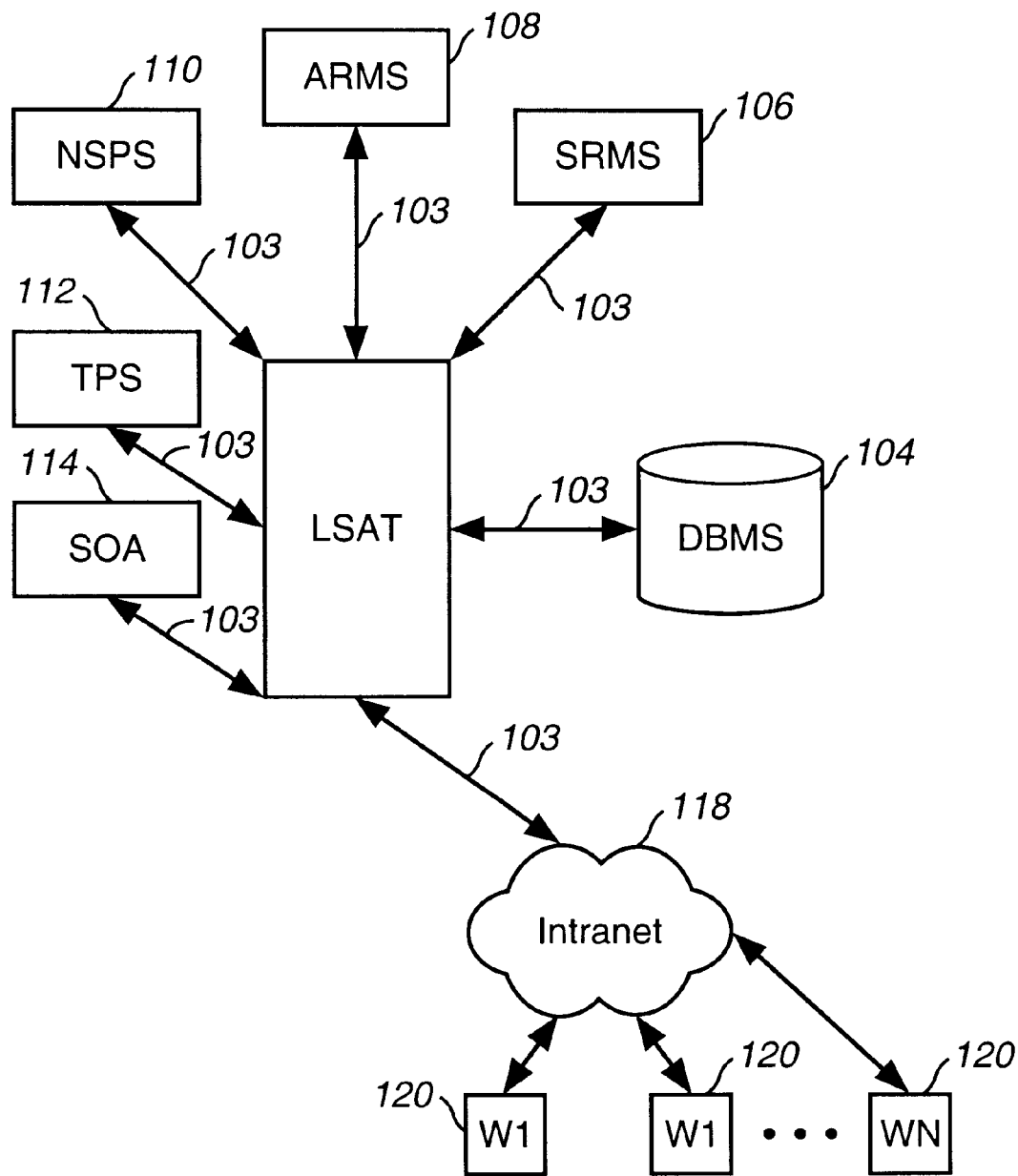
FIG. 1A is a block diagram depicting an operational environment according to a preferred embodiment of the present invention.

FIG. 1A is a block diagram depicting an operational environment according to a preferred embodiment ofthe present invention. A workflow management server running software to implement a preferred embodiment of the present invention, referred to herein as LSAT, is depicted as block 102. An exemplary computer system that can be used to implement the workflow management server LSAT 102 is subsequently described below with reference to FIG. 6. LSAT 102 is coupled with various computer systems 106–114. These computer systems 106–114 are used to conduct business functions for the telecommunications company. These business functions include Service Order processing and the provisioning of telecommunication services.

Specifically, the computer systems 106–114 depicted in this example embodiment include the SRMS 106, ARMS 108, NSPS 110, TPS 112 and SOA 114 computer systems. Each of these example computer systems 106–114 are described in the section below entitled "ISD Support Systems."

A database management system (DBMS) 104 (also referred to herein as "database 104"), is coupled to LSAT 102. The database 104 is used by LSAT 102 to store data associated with the processing and tracking of orders. Preferably, a relational database system, such as Oracle® provided by Oracle Corporation is used as the DBMS 104.

The computer systems 106–114 and the DBMS 104 are coupled to LSAT 102 via bi-directional transmission links 103. These transmission links 103 can be implemented using any type of computer network, such as a Local Area Network (LAN), a Wide Area Network (WAN), a combination of the two, or the like. This includes multiple LANs coupled together with routers, leased telephone lines and/or public or private switched telephone networks to form wide area networks (WANs).

The use of multiple private and public computer networks, such as the Internet, a company-wide Intranet, or the like, can also be used in alternate embodiments of the present invention to connect to the various computer systems 106–114 and the DBMS 104 to LSAT 102.

In the preferred embodiment, a company-wide Intranet 118 is used to couple LSAT 102 with a plurality of workstations W1, W2 . . . WN 120. These workstations 120 are used to interface with LSAT 102 via the LSAT web interface. The LSAT web interface is described in detail below.

Figure 1B:
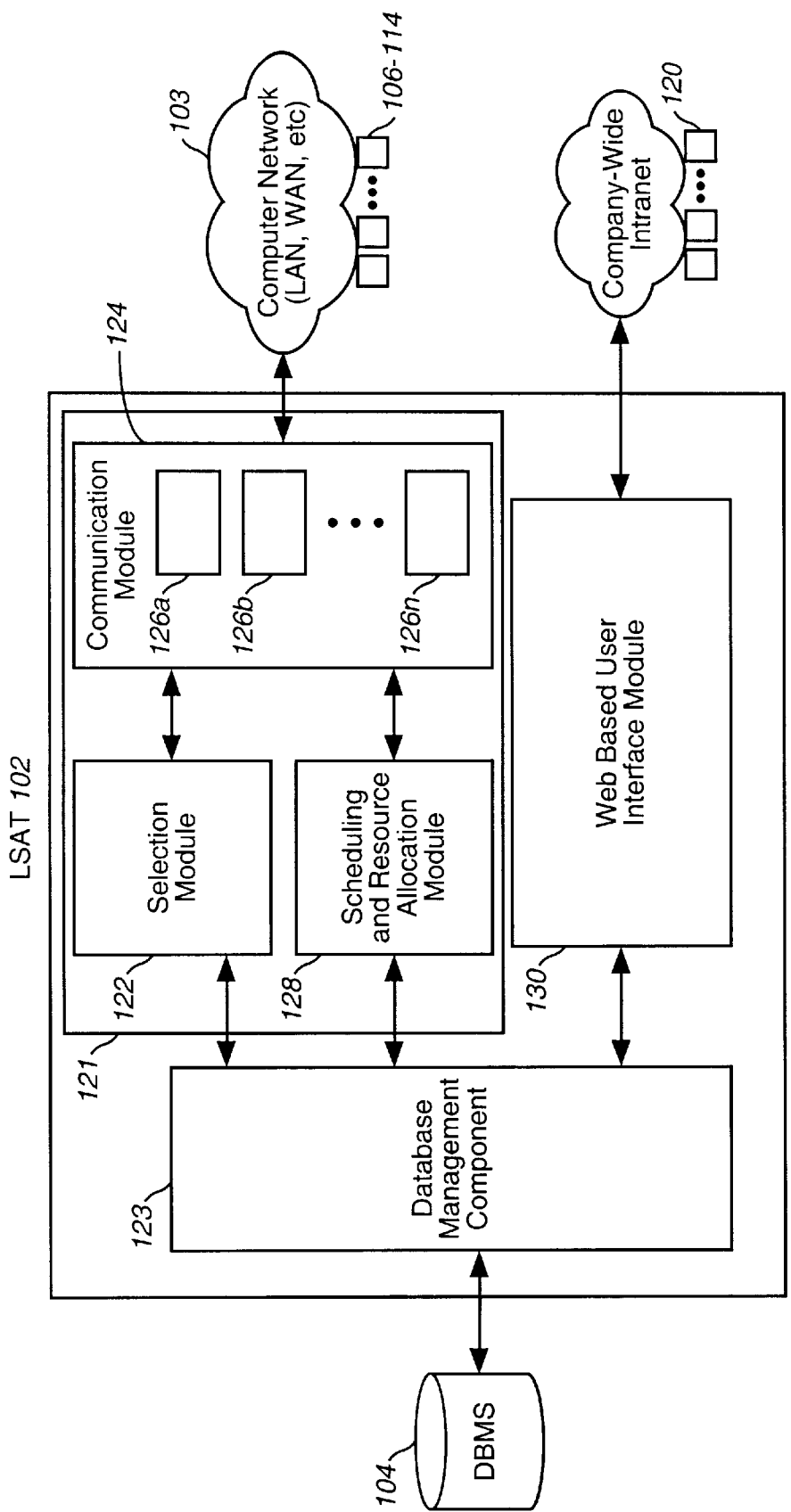
FIG. 1B is a block diagram depicting components of the workflow management server, according to a preferred embodiment of the present invention.

FIG. 1B is a block diagram depicting components of the workflow management server (LSAT 102), according to a preferred embodiment of the present invention. Details of the specific functionality of each component is described below.

The Workflow manager 102 of the present invention is preferably implemented using a distributed Object Oriented design with a three-tiered architecture, as shown by blocks 121, 123 and 130. Its use of a component-based approach enables the telecommunicationcompany to take advantage of commercial software products and external systems. Specifically, the preferred three-tiered architecture is as follows: the LSAT web Interface module 130, the LSAT Engine 121 and the Database Management component 123. The LSAT web Interface module 130 supports the browser based user interface at 120. In a preferred embodiment, the LSAT web Interface module 130 is implemented using C++ and Java.

The web based interface module 130 is coupled with a company-wide Intranet 118, which is coupled with a plurality of remote workstations 120. The web based interface module is used to implement user in-boxes, where users can view 20 services orders and their associated workflow steps. As described below, the web based interface module further provides query capability to provided customized views, reports and tracking information pertaining to current and past Service Orders. The LSAT engine module 121 supports the management of the Workflow, via the selection and scheduling and resource allocation modules, 122 and 128, respectively. In addition, the LSAT engine 121 comprises a communications module 124 to support communication between LSAT 102 and the various computer systems 106–114. The LSAT engine 124 is preferably implemented using C++, and runs on Windows NT operating system.

In particular, the communication module 124 is used to communicate with the various computer systems 106–114 of the telecommunication company, via a computer network 103. The communication module 124 comprises a plurality of components 126a, 126b, . . . 126n (generally, 126). The communication components 126 are used to interface with each of the external computer systems 106–114 used by the telecommunications company. This is preferably accomplished with the use of a messaging system protocol compatible with the each of the existing computer systems 106–114.

The selection module 122 is coupled with the communication module 124 and the DBMS 104, via the database management component 123. As described below, the selection module 122 is used to select a Work Plan from the database 104, to process a particular Service Order. The selection module 122 selects a Workflow from the database 104, based on information from the Service Order, as described below.

The scheduling and Resource allocation module 128 is coupled with the communication module 124, and DBMS 104, via the database management component 123. This module 128 is used to schedule workflow steps and assign Resources (i.e. computer systems, organizations, or individuals), to workflow steps in a Work Plan.

The third tier is the database management system 104 and the database management component 123. The database management system 104 is preferably implemented using a relational database such as Oracle, and is run on a UNIX operating system.

Preferably, the architecture used provides an open, scaleable Workflow management system that supports current products and services. The architecture is preferably flexible so that it can support future products without requiring significant modification. LSAT 102 is designed to comply with current messaging protocols that exist between the various systems 106–114 of the Company.

For convenience, the telecommunication company used in examples below, is hereinafter referred to as "the Company." In order to describe the present invention, an example of a preferred embodiment is described. In the preferred embodiment example, a particular environment, including business rules, workgroups and particular computer systems (i.e. computer systems 106–114) is described. These examples are used herein to describe how to implement a preferred embodiment of the present invention. The examples used herein are for exemplary purposes only, and should not be construed to limit the scope and breadth of the present invention, which is applicable to many other environments in addition to the example environment described herein.

In this example, it is assumed that the Company has a sales force of Local Service Account Executives (LSAEs). The LSAEs actively solicit orders for telephone products and services. These orders are documented in the form of Work Orders and are sent to Local Service Consultants (LSCs). The LSCs obtain detailed technical information about the customer equipment and configuration from the customer's technical representative. The Work Order is then sent to Order Entry where it is entered into the Company's information processing systems.

As they are received, the Work Orders are processed through a series of business steps in order to deliver and bill the purchased products and services. Accordingly, a preferred embodiment of the present invention, LSAT 102 coordinates and tracks orders, traversing them through the business process, starting with the entry of those orders into the data processing infrastructure, and concluding with the notification of completion of the provisioning processes to the appropriate billing systems.

Example Business Area Users

In the example embodiment of the present invention described herein, it is assumed that the following five primary groups of the Company use a computer system referred to as the "Information Systems Development" (ISD) system. These five groups are as follows:

Order Entry (OE);
Provisioning (LSP);
Translations (LST);
Field Operations (Ops); and
Order Coordination (OC)

In addition, there are typically users within the Company that participate in the business process using only the LSAT web interface at 120 to view the status of Work Orders. The LSAT web interface is described in detail below. The business users in this example include:

Local Service Consultants (LSC);

Translations (DTE);

Construction (TSI);

Topology; and

Local Exchange Carrier Coordinators (LEC Coord).

ISD Support Systems

As stated, telecommunication companies typically make use of a variety of computer systems to process orders. Such computer systems are represented herein by the computer systems 106–114. The following is a list of particular ISD computer systems 106–114 used in the examples presented herein. These computer systems provide users with the means to process various portions of Service Orders. Specifically, the computer systems 106–114 include:

SRMS or SRMD/MACD 106—Service Request Management System enhanced with Move, Add, Change, and Disconnect processing. This system is used by Order Entry (OE) to create orders for Local services;

ARMS 108—Access Request Management System. This system is used by Access Service Provisioning (ASP) order entry to create orders for Switched, Special, and Network Access service;

NSPS 110—Network and Services Provisioning System. This computer system is used by Provisioning and Field Operations to provision orders;

TPS 112—Translations Provisioning System. This system is used by Local Service Translations to process a Local Service Order; and SOA 114—Service Order Administration. This system is used by the Company to interact with the LECs for Number Portability orders and the like.

User-System Interactions

Figure 1C:
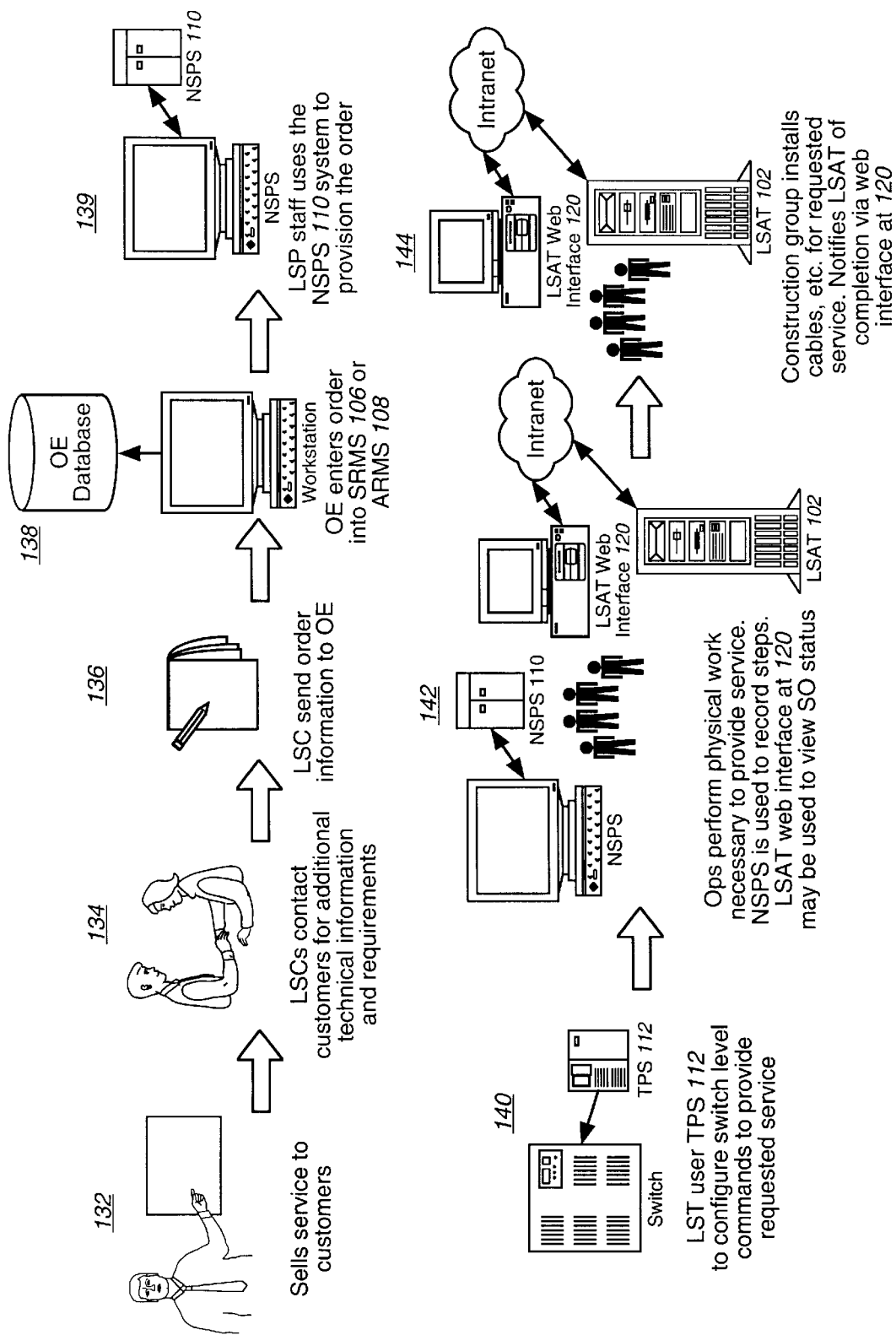
FIG. 1C depicts an example of a the various groups involved in creating and processing Service Orders.

Users from many areas within the Company are involved in the business process and the ISD systems which support it. FIG. 1C graphically depicts an example of a the various groups involved in creating and processing Service Orders.

Local Service Account Executives 132

Local Service Account Executives (LSAEs) are the Company's sales representatives who meet with customers and conduct the sale of telecommunication business products. They are typically assigned at the city level within a region or territory. An LSAE uses a combination of manual and partially automated tools to create orders. This information is then sent to the Local Service Consultants (see immediately below), via E-mail, facsimile, or personal delivery for further processing.

Local Service Consultants 134

Local Service Consultants (LSCs) are sales representatives who contact customers after an initial sales agreement is reached in order to gather additional technical data on customer equipment and requirements. Like LSAEs, they are typically assigned at the city level within a region or territory and may use one of several manual or partially automated means to create an order. Typically, LSCs use a word processing template, E-mail messages and the like, to send order information to Order Entry personnel, as indicated by block 136.

Order Entry 138

Order Entry (OE) personnel are responsible for creating Work Orders and Service Orders from the business sales order information received from the LSCs. Local and Retail Access orders are typically handled by OE staff while Access Service Provisioning (ASP) staff handle order entry for non-Local orders. OE staff use Service Request Management System (SRMS 106) to enter Local Service Orders and Access Request Management System (ARMS 108) to enter Retail Access Service Orders. ASP staff use ARMS 108 to enter orders.

Local Service Provisioning 139

The Local Service Provisioning (LSP) staff use the Network and Services Provisioning System (NSPS 110) to provision an order. This includes the routing of circuits and facilities and the assignment of line equipment number (LEN) and port information and verification of the means to deliver the service request.

Local Service Translations 140

The Local Service Translations (LST) staff use Translations Provisioning System (TPS 112) to configure the switch level commands used to provide the requested service. Translations personnel may also refer to NSPS 110 for additional information.

Operations 142

Operations personnel (Ops) perform the physical work necessary to provide the requested service. They use NSPS 110 to record the steps they have completed in the business process. They may also utilize the LSAT web interface at 120 to view work assignments and order status.

Construction 144

In this example, a construction group referred to as "TSI" performs construction work such as cable installation, etc. In this example embodiment, TSI personnel use the LSAT web interface at 120 to manually record steps they have completed.

Work Units

In the examples used herein, it is assumed that there are two primary methods of quantifying the work performed for customers. These work units are referred to as Service Orders and Work Orders (collectively and/or individually referred to as orders). A Service Order represents the delivery of a single product or service purchased by a customer. A Work Order is composed of one or more Service Orders to be performed for a customer. For example, a single Work Order to install a T1 line and 24 channels at a customer site contains 25 Service Orders. Each Service Order comprises one Service Order for the T1 line, and one Service Order for each of the 24 channels in the T1 line.

The present invention provides that all components of an order flow through an automated environment without having any single component cause any other component unnecessary delay. In order to accomplish this, LSAT 102 preferably operates at the Service Order level. As a result, LSAT 102 can direct Service Orders to the appropriate recipients without delaying other Service Orders in the same Work Order.

Work Order Flow

Work Order flow represents the movement of Service Orders between business functions within the business process. Work Order Flow is represented using Petri-net diagrams, according to a preferred embodiment of the present invention. Petri-net diagrams are discussed below with reference to FIG. 3. These diagrams represent the flow of activities and information necessary to process Service Orders. Many different Workflow Diagrams (WFDs) are created to represent the various combinations of business processes that are used to provide products and services to the Company's customers.

Workflow Management

Figure 2:
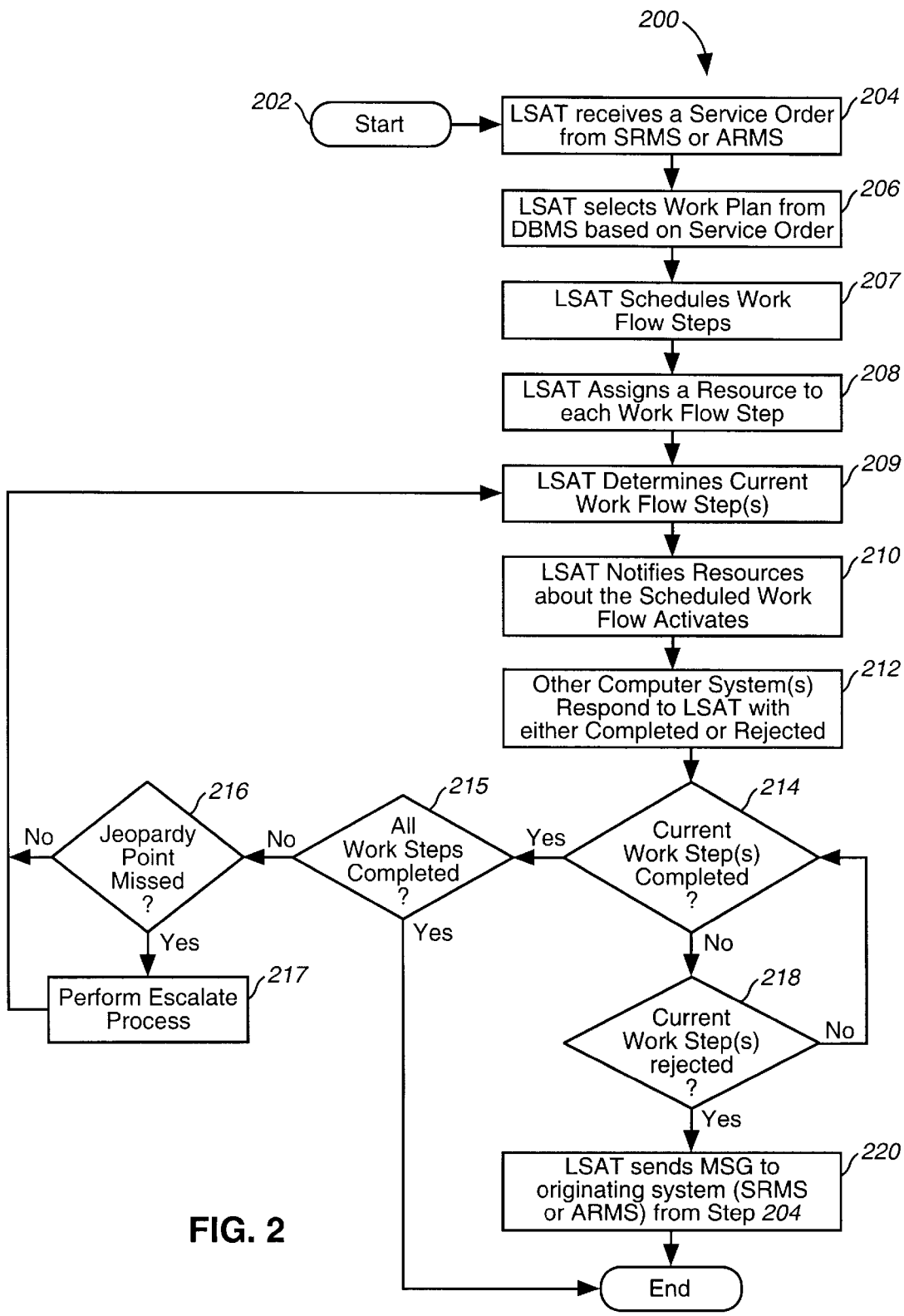
FIG. 2 is a flowchart depicting an overall process of the present invention according to a preferred embodiment.

The Workflow manager 102 of the present invention manages and tracks the Workflow for telecommunication services. FIG. 2 depicts a flowchart that is useful for describing this process according to a preferred embodiment of the present invention. The process begins with step 202, where control immediately passes to step 204. In step 204, LSAT 102 receives a message from either SRMS/MACD 106 or ARMS 108, indicating that a Service Order has been created and approved for downstream processing. Once this message has been received, LSAT 102 obtains information about the Service Order. For example, in one implementation, LSAT 102 obtains the following information, directly from the Service Order:

Service Category;

Service Type;

Transport Method;

Activity Type; and

Extended Activity Type.

Next, in step 206, LSAT 102 uses these data elements to select the Work Plan from the DBMS 104, that best represents the business process necessary to handle the Service Order. Specifically, LSAT 102 uses one or more of the above listed five data elements to select the Work Plan it will use to process the order. LSAT 102 uses a selection algorithm (see 122) to process preprogrammed logic that is applied to one or more of the above referenced five data elements, to select an appropriate Work Plan for processing to Service Order. The Work Plan is selected from the plurality of Work Plans stored in the DBMS 104. A Work Plan comprises a plurality of Workflow Steps (also referred to as "Work Steps" or simply, "steps"). An example of two different representations of a Work Plan (a workflow diagram and a workflow table), is presented and described below with references to FIGS. 3 and 4, respectively.

Once a Work Plan has been selected in step 206, control passes to step 207. In step 207, LSAT 102 schedules the Workflow Steps within the selected Work Plan Preferably, LSAT 102 calculates the planned start and finish times for each step using the customer requested delivery date (CRDD) and/or the customer committed due date (CCDD) as available. The planned delivery date of the Work Plan is calculated using planned start and finish times of the various Work Steps.

LSAT 102 prioritizes the scheduling of Service Orders based upon their status, with "Expedite" orders receiving preference over regular orders and orders in a "Jeopardy" status taking preference over Expedite orders. Expedited orders and orders in a Jeopardy status are described in detail below.

Scheduling a Service Order, or a Supplement to a Service Order (see "Supplemental Service Orders," below), involves identifying all of the activities required to complete the order, determining the order in which the activities should be completed, and specifying the required completion time for each activity. LSAT 102 uses Work Plans and scheduling algorithms (see 128) to accomplish this functionality.

Preferably, Work Steps are scheduled for completion based on the following elements:

Workflow and step dependencies defined in the Work Plan;

Standard intervals defined in each Work Step;

Customer Due Date specified in the order; and

Calendar data maintained by LSAT 102, as described below.

Supplemental Orders are the means by which existing orders are modified. There is a wide variety of reasons for creating a Supplemental Order, ranging from something as simple as an error in the customer address to more complex issues such as the rejection of an order in a later stage of processing because an error was detected.

Generally, Service Orders are scheduled in the order in which they are received. LSAT 102 typically uses the Work Order number assigned by the originating system during order entry to group related Service Orders together. An exception occurs if a Service Order indicates that it should be expedited. Generally, this occurs when delivery dates are promised to customers that would not generally provide the Company with the normal processing time required to deliver those products or services. In such situations, the Local Sales Consultants typically expedite the order so that it will receive priority in scheduling when it is received by LSAT 102 in step 204.

When LSAT 102 receives an expedited order, the scheduling algorithm proceeds based on the Customer Requested Due Date shown on the order. Typically, LSAT 102 provides a distinctive highlighted coloring of expedited orders when viewed through the LSAT web interface at 120.

Thus, expedited Service Orders are given priority by the scheduling algorithm. LSAT 102 preferably displays the originator name and contact data for an Expedited Service Order.

Once a Work Plan is scheduled, control passes to step 208. In step 208 LSAT 102 assigns appropriate Resources to perform the activities or tasks associated with each workflow step. Resources can be computer systems (i.e. 110–114), groups or individual users. Preferably, Resource hierarchy tables stored in the database 104 are used to accomplish this task. In one embodiment, a Resource hierarchy is defined so that LSAT 102 can allocate appropriate Resources for each Work Step based on current work load and availability.

LSAT 102 preferably uses two methods of assigning Work Steps to individual user Resources. The two methods are referred to as Fixed and Round Robin distribution methods. The Fixed distribution method assigns all Work Steps to the specific user Resource as defined by the appropriate Organizational Group.

The Round Robin distribution method uses circular scheduling lists to allocate Resources. Specific methods used to implement these functions would be apparent to persons skilled in the relevant art(s).

Accordingly, much of the data used by LSAT 102 in scheduling and assigning Resources (steps 207–208) is user defined and stored in the database 104. Included in this category of data are Workflow Drawing data, Calendar data, and Resource Allocation data. The underlying property data of a Workflow Drawing, such as the standard interval of a Work Step or a Work Plan, are defined in the drawing and/or Duration Tables and can be modified by authorized users. Calendar data, such as work days, weekends, corporate holidays, and business hours are entered and maintained by authorized users.

A detailed description of a database and database tables that can be used to implement the present invention is described below with reference to FIG. 5 and table 2.

Once LSAT 102 completes the assignment of Resources to each Workflow Step, control passes to step 209. In step 209, LSAT 102 determines the current workflow step. Note that more than one Workflow Step can be current at any instant in time. For convenience however, the current one or more Steps are referred to herein in the singular. Selecting the current Workflow Step is preferably accomplished by examining the dependencies of the Workflow Steps as specified in the Work Plan. For example, as will be seen below with reference to FIG. 4, each step in the Work Plan specifies which steps must be completed before each step may become current.

Next, as indicated by step 210, LSAT 102 notifies the Resources about the scheduled workflow activities. In one embodiment of the present invention, this is accomplished by placing the Work Steps in the In-Boxes of the assigned Resources (step 208). In addition, LSAT 102 notifies those Resources by sending messages to the appropriate computer systems 106–114.

Accordingly, in one embodiment of the present invention, after each Workflow Step has been scheduled (see step 207), LSAT 102 places the steps in the appropriate In-Boxes associated with the assigned Resource (step 208). The Resource allocation algorithms described above are used along with the Work Plans to implement these functions. In addition, in a preferred embodiment, the current steps are marked as current in the in-Boxes where the steps appear. The Resources associated with each Work Step is listed in the Work Plan.

Thus, viewing the In-Box is one way in which users are notified of the assignment and its associated due date. Typically, an embodiment of the present is implemented such that all Work Steps placed in an In-Box can be viewed by the assigned Resource, but the Resource may only respond to those steps marked as current by LSAT 102.

In addition, authorized users of LSAT 102 can enter, and maintain (i.e modify and delete) Organizational Groups and their associated Resources. Authorized users can also assign user-defined labels to the hierarchical structures defined for their Organizational Group. LSAT 102 utilizes a Resource assigned to a Work Step for all Service Orders for a Work Order.

In another embodiment of the present invention, Resources are notified about upcoming activity by LSAT 102 sending one or more messages to the appropriate systems. For example, LSAT 102 sends messages to the computer systems 106–114 to indicate that a workflow step is now ready to be processed.

Accordingly, LSAT 102 communicates with the relevant computer systems, such as computer systems 106–114, involved in processing the order. This is accomplished with the use of a messaging system protocol compatible with the existing computer systems 106–114 that are in use by the Company. The messaging system provides notification to the various computer systems and receives confirmation therefrom, as tasks are completed and/or rejected (see next step 212).

In addition, LSAT 102 maintains a history file of the actions taken on each task in the Work Plan Step. Examples of data maintained in such history files is subsequently described below in the section entitled "History File Data."

Next, as step 212 indicates, LSAT 102 receives a response from one or more of the computer systems 106–114, from step 210. Preferably, such responses indicate either that the step has been "Completed" or "Rejected." This response can come in the form or an automated response via a message from one of the computer systems 106–114. Alternatively, the response to indicate that one or more step are complete can come in the form of a manual response, wherein a user manually indicates at the LSAT web interface at 120, that a step is complete. Once LSAT is informed that the current Work Step is complete, control passes to step 214.

Next, step 214 determines if the current Work Step has been Rejected. If not, control passes to step 218. Next, as step 218 indicates, if the current Work Step has been Rejected, LSAT 102 sends a message to the originating system (in this example either the SRMS 106 of the ARMS 108) from step 204. Generally this indicates to the originating system that more information is needed to complete the Service Order. The process then ends, as indicated by step 222.

If it is determined in step 218 that the current Work Step has not been rejected, control passes back to step 214. If it is determined, in step 214, that the current Work Step has been completed, control passes to step 215. In step 216, the process determines if all of the Work Steps in the Work Plan have been completed. If so, the process ends with step 222 as indicated. If not, control passes to step 216.

In step 216, the process determines whether a Jeopardy point has been missed. LSAT 102 tracks the status of each Work Plan against the planned schedule in step 216, as various Work Steps are completed. Specifically, the process in step 216 first determines if the completed Work Step is associated with a Jeopardy point, according to information in the Work Plan. If it is not, control passes back to step 208 and the process continues as described above. If the Work Step is associated with a Jeopardy point, then the process compares the completed date and time with the scheduled date and time for the Work Step. If the completed date and time is later than the scheduled date and time, then a Jeopardy point has been missed and control passes to step 217 where an escalation process (described below) is performed.

The Jeopardy points for the Work Plan are calculated using the same data as the scheduling calculations. Jeopardy points identify tasks in the Work Plan that have deadlines and carry a degree of risk. Should a deadline pass, the order is in jeopardy of missing the due date and the Resources assigned to unfinished tasks are alerted to this risk by the escalation process 217.

Once any Jeopardy point defined for a Work Plan is missed, the escalation process in step 217 places all of the remaining Work Steps for the Work Plan in a Jeopardy state and elevates the priority of the Work Plan. The Resources assigned to the uncompleted Work Steps of that Work Plan are notified of the Jeopardy status via their LSAT In-Boxes and/or system notification messages.

LSAT 102 preferably, also provides for manual posting of Jeopardy conditions. This may be assigned to any defined Work Step in a Work Plan when conditions arise that make it probable that the Work Plan will not be completed by the scheduled completion time. LSAT 102 records when the Jeopardy condition is corrected, and the Work Plan is again on the scheduled time frame.

In addition, in one embodiment, LSAT 102 begins a Jeopardy escalation process after a user specified period of time, whereby higher levels of management are made aware of the problem as the delay lengthens. As the Jeopardy state is escalated, each higher level of notification will occur using the recipient's choice of pager, e-mail, or a message sent to another system. The assigned Resource associated with the missed Jeopardy point has the opportunity to delay escalation of the Jeopardy state by indicating that the problem is being addressed.

Preferably, the Workflow Steps following a missed Jeopardy point are highlighted in the In-Boxes to indicate this condition. Typically, the assigned Resource associated with the missed Jeopardy point has the opportunity to delay escalation of the Jeopardy state by indicating that the problem is being addressed.

After the escalation process has completed, control passes back to step 208, where next Current step(s) is/are determined, and the above process is repeated as described above.

LSAT User Interface

The LSAT user interface at 120 is preferably an Intranet-based 118 application, that allows users to monitor an order as it progresses through the steps defined in the associated Workflow. Accordingly, LSAT 102 is accessible through any web browser (e.g. Netscape Navigator, Microsoft Internet Explorer, or Next OmniView). In this fashion, users throughout the Company can view pending work, work in progress, completed work, and archived work at the workstations 120.

Pending Work Orders are viewed in an "In-Box" that is accessible through the LSAT web interface at 120, according to a preferred embodiment of the present invention. Users can view and access other relevant data through this single interface. The present invention preferably displays all Service Orders that are Expedited or in a Jeopardy status in a distinctive color for ready identification by users.

Service Order Types

As stated, Service Orders describe individual products and features requested by customers. Work Orders are a convenient method for grouping related Service Orders to process service requests in an efficient manner. A Work Order may be thought of as a container for related Service Orders. Preferably, Service Orders are the primary unit handled by LSAT 102. Each Service Order moves through the system independently from the other Service Orders comprising a particular Work Order.

In this example, there are two primary order types within the business processes: Local Service and Access Service. Local Service Orders originate from SRMS/MACD 106, and are comprised of one or more Service Orders. SRMS/MACD Local Service Orders map directly to LSAT 102 Service Orders and describe individual products and features requested by customers.

Access Service Orders originate from ARMS 108 and are comprised of descriptions of circuits. ARMS Circuits describe individual connections between two points having specific features requested by customers. Access Service Orders also map directly to LSAT 102 Service Orders.

The present invention organizes Service Orders in logical groups with matching characteristics that are known at the time the Service Order information is passed from SRMS/MACD 106 or ARMS 108 to LSAT 102. As subsequent Service Orders and their associated information is passed to LSAT 102, new LSAT 102 Service Order groupings may be created.

Local Service

An order, which falls into the Local Service category, provides products or services to a commercial business or residential customer solely within the local marketplace.

Within the Local Service category there are two attributes: On Net and Off Net, according to this example embodiment. The Company Network is comprised of many elements of network facilities installed in metropolitan areas for the purpose of providing services. Any Local Service connected to one of these facilities is described herein as being On Net.

Off Net is used to describe Local Service that require the use of network facility's not owned by the Company. Off Net orders are processed by leasing network access from the local exchange carrier.

Access Service

In this example embodiment, the three types of service provided within the Access Service category are Switched Access, Special Access, and Network. These service types enable other telephone companies to fulfill Service Orders requiring access beyond their own networks and provide service within the Company to other locations. Switched access provides point to point trunks with dial tone. Special access provides point to point trunks without dial tone, and Network access is used to add or augment trunk groups within the Company.

Supplemental Orders

Once an order has been created within SRMS/MACD 106, changes are made using a Supplemental Order or "Supp". Supplemental Orders are typically only used to modify Service Orders that have not been closed to billing.

Because a change contained in a Supplemental Order may have an impact on how the original order should be processed, LSAT 102 reassess the Workflow selected and the Resources allocated for the affected order. Supplemental Orders are typically only created by Order Entry in response to a customer request or an error identified by a downstream user.

System Interfaces

Preferably, LSAT 102 is compliant with a messaging protocol used by the Company's computer systems. For example, in a preferred embodiment, LSAT 102 is COBRA compliant and uses an Object Request Broker to interface with other ISD systems 106–114.

SRMS/AMCD

In this example environment, SRMS/MACD 106 handles new telecommunication orders and additionally supports Moves, Adds, Changes, and Disconnects. SRMS/MACD 106 provides a single Local Service Order entry mechanism for switched local products and services. SRMS/MACD 106 manages a database containing the local services provided to each customer and provides system users with the ability to examine and produce reports on these services.

In a preferred embodiment, the SRMS system 106 is programmed to notify LSAT 102 of Service Orders, Supplemental Orders, and Rejections of orders as they are entered by an Order Entry staff.

ARMS

In this example environment, ARMS 108 supports Access Service Request (ASR) processing for Switched, Special Access, Retail Special Access, and internal network Orders. ARMS functionality is based on SRMS 106 and provides similar order processing data to LSAT 102 as does SRMS 106. ARMS 108 shares a database with the NSPS 110.

In a preferred embodiment, the ARMS system 108 is programmed to notify LSAT 102 of Service Orders, Supplements to Orders, Corrections to existing Orders, and Rejections of Orders as they are entered into the system.

NSPS

In this example environment, NSPS 110 supports provisioning of network products and services, augmenting network capacity, and maintaining the logical view of all network elements in the network topology database. It processes, controls, and schedules Service Orders, requests, and notifications through NSPS work steps. NSPS 110 is closely tied to the Access Request Management System (ARMS 108).

In a preferred embodiment, the NSPS system 110 is programmed to notify LSAT 102 of the completion of assigned NSPS work steps.

TPS

In this example environment, TPS 112 automates the collection and compilation of all parameters needed to provide switch translations for Local Service Orders by the Local Service Translations organization (LST). TPS 112 facilitates direct on-line access to SRMS/MACD Service Orders, automates all necessary look ups of additional parameters, and provides an integrated view of all parameters needed to provision switch translations for Local Service Orders.

In a preferred embodiment of the present invention, the TPS system 112 is programmed to notify LSAT 102 of the completion of assigned TPS work steps.

NPAS

In this example embodiment, NPAS 110 maintains Local Exchange Routing Guide (LERG) information received from Bellcore on a monthly basis for use by other Local systems.

In a preferred embodiment, LSAT 102 queries NPAS 110 for the Switch Common Language Location Identifier (CLLI) code using NPA_NXX (area code and first three digits) information contained in the Local Service Order.

SOA

In this example, embodiment, SOA 114 automates the passing of data between the Company and Number Portability Administration Centers (NPACs) for the purpose of porting residential and business telephone numbers. SOA 114 supports the transfer of data required for the proper routing of inbound and outbound calls.

In a preferred embodiment, the SOA system 114 notifies LSAT 102 of the completion of assigned SOA work steps.

LSAT Web Interface

The LSAT web interface is a web based graphical user interface, which enables end users to interact with the Workflow system of the present invention. The interface application is preferably implemented on a Server (such as a Microsoft NT Server or the like), and provides access to Service Order status information maintained by LSAT 102, SRMS MACD 106, and ARMS 108.

Information pertaining to Service Order number (SON), Work Order number, Customer Name, City, State and Service Order status of Work Steps for each Work Plan is available for display. In addition, the Company's Service Location is available for display. In a preferred embodiment, authorized users of the LSAT web interface at 120, can filter their In-Boxes based on various parameters to view specific Service Order information.

As indicated above, each authorized user is provided with an electronic In-Box. Service Orders assigned to that user are posted in their In-Box. Each Service Order appears as an item in the LSAT 102 display. By selecting the Service Order number, detailed information about the Service Order can be displayed.

Through the web interface at 120, an authorized user can view, query, and respond to a Service Order, view work assigned to other users and groups, and create custom queries. In addition, managers and other authorized users can reassign work through the LSAT web interface at 120.

Other Interfaces The following interfaces do not interact with LSAT 102 120 in this example embodiment. However, in other embodiments these interfaces may be used to interact with LSAT 102 120. As such, these other interfaces are presented herein for completeness.

An interface referred to as the Outbound Access Request System (OARS) provides automated transmission to the LECs of outbound ASRs for special access service.

The Local Exchange Carrier (LEC) interface allows the Company to interact directly with local telephone companies. Local Service Requests (LSRs) and Access Service Requests (ASRs) are created online and exchanged with a LEC.

The Network Optimization Expert System (NOES) is used by Capacity Planning to determine the appropriate network capacity for specific time periods.

The Network Inventory System (NIS) is the source of all switch and transmission physical facilities, synchronizing itself with different network elements and providing exception reporting when its database differs from the network element database.

System Data

In a preferred embodiment of the present invention, certain information is required to process and track orders. While many data elements used in the various decision making processes are acquired from other ISD systems 106–114, LSAT 102 creates and stores a significant amount of support data which is primarily used in making Resource allocation decisions.

In a preferred embodiment, a database management system, such as an Oracle database is used to store such data. LSAT 102 system data includes: calendar based scheduling information; user defined scheduling information; lookup tables containing translation information; a library of Workflow Drawings; user defined duration tables; and a library of Work Plans derived from the Workflow Drawings. The section below describes these data elements.

Calendars

LSAT 102 preferably maintains calendar based information in order to properly fulfill its scheduling and Resource allocation functions. Corporate calendar data, that is year 2000 compliant, is maintained by LSAT 102 to ensure that work is not scheduled on weekends or official holidays and the like. In addition, LSAT 102 uses corporate calendar data to ensure that Jeopardy Points (described below), are only scheduled on work days. Typically, authorized staff can update and maintain the corporate calendar as necessary.

LSAT 102 Data Tables

Preferably, LSAT 102 stores a number of tables used to implement scheduling and Resource allocation and to process Service Orders. Some of the information that resides in these tables is user defined and may be easily changed by users having the proper authorization. Other information is either fixed in nature or requires administrative access to the system in order to modify the data.

For example, Switch Common Language Location Identifier (CLLI) information is needed to determine the proper user Resource of an order for Local Service Provisioning (LSP) or Local Service Translations (LST). Typically, this information is not captured by SRMS/MACD 106. Accordingly, LSAT 102 requires this additional data before a Work Plan can be established. Thus, a translation look-up table is used for the Switch CLLI information.

To accommodate this requirement, LSAT 102 preferably employs a database table that describes the relationship between CLLIs and Regions to translate known information into required information needed to make the appropriate Resource allocation decisions.

Workflow Drawing Library

LSAT 102 preferably maintains a library of Workflow Drawings (WFDs). WFDs are diagrammatic representations of the business processes. Typically, WFDs are created using a template based drawing tool, such as VISIO®, manufactured by Visio Corporation. A Workflow Drawing contains a group of connected objects which represent the steps in the business process necessary to complete a Service Order and the Workflow between those steps. The data in the Workflow Drawing library are maintained and updated by individuals with Administrative Security access (described below). LSAT 102 utilizes the most current version of WFDs for the scheduling and allocation of Resources when Service Orders are received from SRMS/MACD or ARMS.

Work Plan Library

LSAT 102 preferably maintains a library of Work Plans that are generated from the user defined Workflow Drawings. A Work Plan contains a specific series of Work Steps each of which is assigned to a Resource in order to accomplish the processing of a Service Order. Work Plan data is stored in the database and used by the scheduling and Resource allocation algorithms. The data in the Work Plan library are maintained and updates as necessary by users with Administrative Security access.

History File Data

As Service Orders are processed, LSAT 102 preferably records the details of many of the activities and events that occur as these orders flow through the system. This data is maintained in a manner that enables users to generate ad hoc reports on order processing and reconstruct the Workflow of any specific Service Order.

Workflow Models

In a Workflow environment, the items being processed are tracked by the software system using a database or some related mechanism. LSAT 102 preferably uses a Work Plan comprised of one or more Work Steps to implement the Workflow management feature of the present invention. Each Service Order is associated with a Work Plan. LSAT 102 uses that Work Plan to control and monitor the Service Order as it progresses through the business process. Workflow Drawings are used by LSAT 102 to depict Work Plans.

It should be noted that a single Work Plan may be used to process more than one type of Service Order. LSAT 102 provides scheduling and Resource allocation algorithms to support Workflow management and a graphical user interface to support Workflow tracking. LSAT 102 supports workforce management in addition to Workflow management.

Workflow Drawings

Workflow Drawings (WFDs) (also referred to as Workflow Diagrams or Flow Diagrams) are diagrammatic representations of portions of the business process. The WFDs are annotated as necessary to describe the steps and decision points which occur during the processing of an order. The Workflow Drawing paradigm in this example embodiment is based on a Petri-net model. In this example, centers of activity are joined together in a flow pattern, decision points are identified, and parallel and serial processing are depicted.

The WFDs indicate the Workflow messages that are sent and received between LSAT 102 and the other computer systems 106–114. Every flow in a WFD has a distinct beginning and a distinct end point. As stated, a drawing tool can be used to define and manipulate the Workflow Drawings. Preferably, the WFDs are created using custom objects in a template based drawing program, such as VISION. This allows the modification and creation of WFDs without the change or modification of LSAT 102 source code.

Each Workflow Drawing contains one Workflow, depicting the processing flow of an order as a series of steps and defining the dependencies and interactions of those steps. The tool used to create Workflow Drawings also enables the creator to define the properties of each of the objects in the drawing. These properties are used to describe how the object will behave. Once a Workflow Drawing is complete and its properties are defined, the Workflow Drawing is stored in the Workflow Drawing library and the underlying data is stored as a Work Plan in the Work Plan library.

The same drawing tool used to create the Workflow Drawings is preferably used to maintain both the object drawings and the properties data behind them. Workflow Drawings are maintained under strict LSAT 102 Configuration Management guidelines since these drawings model the active business process.

An example of a Workflow Drawing is depicted below with reference to FIG. 3.

Work Steps

A Work Plan is an organized series of Work Steps identifying the activities necessary to deliver a product and defining the relationships between those activities The Work Plan models the real world business practice and each Work Step in the Work Plan models an activity or task that must be performed by an individual or a computer system 106–114 to complete the business process.

LSAT 102 tracks the status of each Work Step from the time it is scheduled (status of pending) through the time it is being acted upon (status Current) until it is reported completed (status Complete). This information of Work Step status is available for viewing through the LSAT web Interface at 120 as described above.

Within LSAT 102, Work Steps may be completed or rejected. A Work Step is completed either automatically or manually. Typically, automatic completion occurs when the task represented by a Work Step is completed in another system, and that system notifies LSAT 102 of the completion of the Work Step. There is no direct user involvement with LSAT 102 in this inter system communication and, other than having the next Work Step in the Work Plan become current, users will not typically be aware of this communication at all.

If a Work Step is rejected, the user can enter a Reason Code and a text message to indicate the reason for the rejection. If a Work Step is rejected LSAT 102 stops the processing of the Service Order and sends a message to the originating system to indicate the rejection and the accompanying reason.

Manual completion of a Work Step occurs when an individual uses the LSAT web interface at 120 to indicate completion of the Work Step. This is required whenever the system supporting that Work Step does not have a corresponding System function, or the Work Step is not supported by another system.

Workflow Tracking

Workflowtracking begins when LSAT 102 is notified by SRMS/MACD 106 or ARMS 108 that a Service Order is ready for processing. LSAT 102 then queries the appropriate system, collects information about the Service Order, selects the proper Work Plan, and makes the Resource allocations necessary to process the Service Order.

Service Orders are tracked from the time LSAT 102 receives notification of the Service Order until notification is sent to the appropriate system that the service is available to the customer. This starts the process to begin billing for the service. LSAT 102 monitors the progress of a Service Order as it flows through the Work Steps of the Work Plan. If any of the Jeopardy Points in the Work Plan are not completed by their scheduled completion time, LSAT 102 places the remaining Work Steps in a Jeopardy State. A Jeopardy point will preferably initiate a Jeopardy Escalation process.

Authorized users can reassign Work Steps to a different individual human Resource or a different organizational group Resource. Authorized users can also reassign all of the Work Steps or Work Plans in a Resource In-Box to another Resource In-Box. Whenever the supervisor or manager of an Organizational Group performs a manual reassign mentor distribution, LSAT 102 records the identity of the individual performing that manual function.

Work Force Management

This feature ofthe present invention allows for Load Balancing of Resources. In particular, users can reassign Work Steps to different Resources using the LSAT web based interface at 120, based on Resource availability.

Example of a Workflow Diagram and a Workflow Table

An example of a Workflow Diagram will now be described with reference to FIG. 3. The example Workflow depicted by the Workflow Diagram 300 would be selected by LSAT 102 to process a new or add order for Local Services. In this example, the Workflow depicted by Workflow Diagram 300 uses On Net as the Transport Method. An example of a tabular representation of the Workflow diagram 300 is presented and discussed below with reference to FIG. 4.

In the Workflow Diagram 300, two types of Workflow Steps are depicted, namely System Notification Steps and User Work Steps. System Notification steps are shown with all CAPITAL LETTERS. User Work Steps are shown in mixed case.

In general, System Notification Steps are used to pass information between LSAT 102 and the various computer systems 106–114. These steps are generally completed automatically by LSAT 102 or by the various computer systems 106–114 when certain activities are completed. Typically, System Notification steps can occur using one of two methods, depending on the particular system 106–114 involved and the Workflow Step. In one method, LSAT 102, continuously or periodically polls the other computer system, such as SRMS 106, for the presence of a particular event. For example, LSAT 102 can systematically poll SRMS 106 for the presence of new Service Orders. Alternatively, each of the computer systems 106–114 are programmed to specifically send a message to LSAT 102, when particular events occur. For example, in one implementation, SRMS sends LSAT 102 a message, indicating the a new Service Order is ready to be processed. Of course, a combination of these two methods can be used in alternative embodiments of the present invention.

Figure 3:
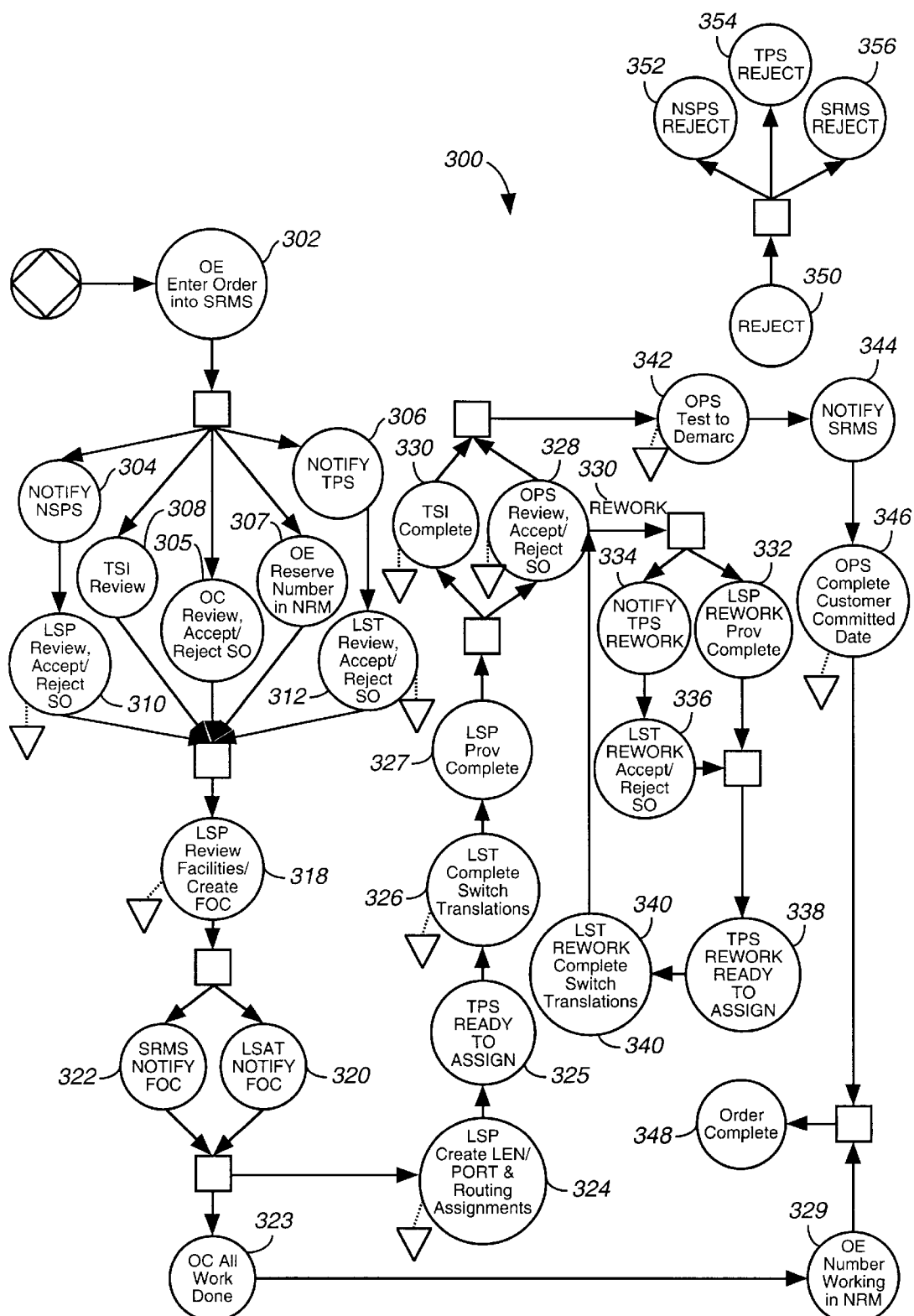
FIG. 3 depicts an example of a Workflow Diagram according to a preferred embodiment of the present invention.

User Work Steps, as shown in FIG. 3, are steps that are generally performed by users within the Company. The name of the group, individual or system that performs these steps are depicted in the name of the User Work Step shown in FIG. 3.

User Work Steps and System Notification Steps can be completed either manually or automatically. Automatic completion of System Notification steps can take place via acknowledgments from and between the various computer systems 106–114 and LSAT 102.

Automatic completion of User Workflow Steps occurs when a function is completed in an identified computer system, such as computer systems 106–114, and that function corresponds with a particular LSAT 102 Workflow Step. For example, the step represented by block 310 is automatically completed when a person in the LSP group (after reviewing a Service Order for accuracy), enters into the NSPS system 110, an indication that the Service Order is accepted. In this case, the NSPS system automatically notifies LSAT 102 that the Use Workflow Step is complete. In this example, where LSP accepts the Service Order, the next step in the LST Workflow would become the current step (in this example, the step represented by block 318).

Manual completion of User Workflow Steps occurs when a user logs into the LSAT web interface and Completes an LSAT 102 Workflow Step. In general, this is performed when there is not a corresponding computer system function, as described above, associated with the Workflow Step. For example, when another telecommunications company must perform some work, such as translations for access orders, there is no corresponding computer system within the Company to monitor that computer system for verification that work has been completed. In this case, manual completion of the Work Step is preferably performed.

The Workflow Diagram 300 will now be described in detail. As shown by block 302, the Order Entry Hub enters a Service Order (also referred to herein as "order"),into SRMS 106. This step is completed automatically by the system. That is, SRMS 106 automatically sends LSAT 102 a message indicating a Service Order is ready for processing. LSAT 102 retrieves the order and notifies both the NSPS system 304 and the TPS system 306 that the Service Order is waiting. LSAT 102 also notifies the TSI organization as indicated by block 308. In addition, as indicated by block 305, the Order Coordination group (OC) reviews the order and either accepts or rejects it. Similarly, as indicated by block 307 Order entry reserves a number for Service Order in the Number Reservation Manager (NRM) system.

As indicated by block 310, the Local Service Provisioning group (LSP) reviews the order and either accepts or rejects it. If it is accepted, the LSP activates a WORK command in NSPS 110 and this step automatically completes in LSAT 102. If the order is rejected, it is returned to SRMS 106 for additional information.

The LST reviews the Service Order and either accepts or rejects it, as indicated by block 312. If the Service Order is accepted, and the LST activates the "TPS ACCEPT SO" command in TPS 112, this Step automatically completes in LSAT 102 by receiving a notification from LST. If the order is rejected, it is returned to SRMS 106 for additional information.

As stated, the TSI organization also reviews the order, as shown by block 308. In this example, TSI is responsible for any construction activity required to facilitate the implementation of the Service Ordered. It should be noted that according to the Workflow Diagram 300, TSI's review (block 308) can continue simultaneously with the other Workflow Steps, but must be completed by the time the Operations group (OPS) completes their review, as indicated by blocks 328 and 330.

Note that the LSP and LST Review Accept/Rejectsteps (blocks 310 and 312) are concurrent. After the order has been accepted by both of these organizations, the LSP reviews the facilities and creates a due date for the Service Order completion, that is referred herein as the Firm Order Commitment (FOC), as shown by block 318.

Next, LSAT 102 sends a system notification message to SRMS (block 322) indicating that the FOC is available. In addition, as block 320 indicates, LSAT 102 sends a system notification to itself, when the FOC has been sent. This notification is used by LSAT 102 to recalculate the scheduling times for the remaining Work Steps in the flow, in the event that the Customer Requested Due Date (CRDD) is different than the Customer Committed Due Date (CCDD.).

Once the FOC date is known, a manual process is begun, that includes the following steps (not shown): submitting and receiving Directory Assistance/DirectoryListing information to/from the LEC; distributing the order to the 911 vendor; submitting the Customer Account Record Exchange (CARE) transaction to the Long Distance vendor, and submitting Line Information database (LIDB) information for direct and third party calls. CARE is a system this is used to select a default long distance carrier when a local customer initiates a long distance call. The LIDB database is used to verify third party caller information when a caller places a third party call.

When these manual activities are complete, the "ALL WORK DONE" step is completed by Operations Coordination (OC) in LSAT 102, as indicated by block 323. The last manual step in this sub-process is OE Number Working in NRM, as indicated by block 329. This step is completed after receiving confirmation that the number status has been updated from "Reserved" to "Working". This manual process can be performed at any time, but must be completed by the Customer Committed Date as indicated by block 348.

As indicated by block 324, the Local Service Provisioning group (LSP) creates the line equipment number (LEN), port and routing assignments. When these activities are complete, the ROUTE_DONE command is used in NSPS to notify LSAT 102 of its completion, as indicated by the triangle connected to block 324.

Next, as shown by block 325, LSAT 102 120 sends a system notification to TPS 112, indicating that it is ready to assign the Service Order to TPS 112 for processing. This tells TPS 112 that their next step, is to complete the switch translations, as shown in block 326. The Workflow step 326 is completed automatically in TPS 112 and is their final involvement with this example Workflow.

The LSP uses the "PROV COMPLETE" command to automatically complete the step in NSPS, as indicated by block 327. This is the final provisioning step in this example Workflow. As block 328 indicates, Ops reviews the Service Order and either accepts or rejects it. If the Service Order is rejected, it defaults to a REWORK sub-flow, as indicated by 330. This sends the Service Order back to the LSP group (block 332), who completed the provisioning and through all four of the TPS steps for revisions, as indicated by blocks 334, 336, 338 and 340. Ops then gets another opportunity to review the order and either accept or reject it, as indicated by block 328. As indicated, the Service Order can be reprocessed through the REWORK steps 332—340, as necessary until Ops finds it acceptable.

If Ops Accepts the Service Order (block 328) and TSI completes all construction activities that were necessary (block 330), then Ops completes the installation and tests to the Demarc (i.e tests the service at the customer location), as indicated by block 342. LSAT 102 then sends a system notification to notify SRMS 106 that the order is nearing completion and that procedures to begin billing should be started, as indicated by block 344.

Ops next completes the customer committed date in NSPS 110, as indicated by block 346. This is the Order Due Date. The manual process concluding with OE Notifying that the number is "Working" in NRM, as indicated by block 329, rejoins the flow at this point, and the order completes, as indicated by block 348.

Note that a Service Order can be rejected by any work step in the flow. A reject Service Order flow is shown by blocks 350, 352, 354 and 356. Specifically, if an order is rejected, NSPS 110, TPS 112, and SRMS 106 are notified. If this occurs, the order automatically stops and is returned to SRMS 106 for additional information. The order can be reprocessed as a Supp, which will show as a different version number of the original order.

An example of a tabular representation of the Workflow diagram 300 is depicted in FIG. 4. The Workflow Table 400 depicts information that is extracted from the DBMS 104 by LSAT 102 to select and process Service Orders. In the Workflow Table 400, each of the Workflow Steps are represented by a row (labeled 1–30), as column 402 indicates. In addition, each of the 10 columns 404–422 represent a specific type of information extracted from the database 104 that is associated with the Workflow Step.

Column 404 lists a name for each Workflow Step. Column 406 lists the name for the property associated with each Workflow Step. Column 408 contains the name of the Resource associated with each Workflow Step. The Resource can be a group, an individual or a computer system 106–114. Column 410 contains the name of the computer system associated each Workflow Step. Column 414 is used to identify whether the associated Workflow Step is automatic or manual. In this example, if the associated Workflow Step is automatic, "Yes" is indicated in Column 414. If the associated Workflow Step is a manual one, "No" is indicated in Column 414. Column 416 is used to indicate the name of the Workflow. In this example, the name is LSONNNAD.

Column 420 is used to indicate the type of activity represented by the Workflow Steps 402. In this example, the activity is for adding service. As such the keyword "add" is stored in Column 420. LSAT 102 uses the information, contained in this field (in addition to other information, not shown), in the selection algorithm to select a Workflow according to the Service Order being processed. Column 422 lists the transport method for the Workflow. In this example, the transport method is "On-Net". LSAT 102 uses the information contained in this field (as well as other information), in the selection algorithm to select a Workflow.

The Workflow Table 400 is a tabular representation of the each of the Workflow Steps as previously described for the Workflow Diagram 300, as described above. Therefore, in the section below, only a select number of Workflow Steps are described in detail.

For example, Step 7 in the Workflow Table 400, corresponds with block 310 in the Workflow Diagram 300. In this step, the LSP group (column 408) enters into the NSPS 110 system (Column 410) an indication that the Service Order has been approved. As indicated by Column 414, this is an automatic step. Thus, the NSPS system is preprogrammed to send to LSAT 102 the command "NSPS_PROV_ APPROVE", as indicated by Column 406, according to a preferred embodiment of the present invention. Column 412 indicates that Workflow Step 7 cannot be current until Work Step 3 has been completed. In this example, Workflow Step 3 is where LSAT 102 notifies NSPS about the Work Order.

In another example, Workflow Step 9 in the Workflow Table 400, corresponds with block 305 in the Workflow Diagram 300. In this step, the Order Coordinationgroup (OC), reviews the Service Order and accepts or rejects it. This is an example of a manual step, as indicated by Column 414. As such, this step is generally manually input into LSAT 102 (see Column 408), by someone in the OC group, as indicated by column 408. This is typically accomplished through the LSAT web based interface at 120, as described herein. The only pre-requisite to this step, is step 2, which is the order entry into SRMS 106. Thus, as soon as LSAT 102 receives notification of a Service Order, Work Step 9 becomes a current step.

In another example, Work Step 10 in the Workflow Table 400, corresponds with block 318 in the Workflow Diagram 300. In Step 10, the LSP group reviews the facilities associated with the Service Order and creates the Firm Order Commitment (FOC). In this example, the LSP group (see Column 408), inputs information into the NSPS 110, to indicate that the an FOC has been created. This automatically(see Column 414), causes the NSPS 110 (see Column 410) to send the "NSPS_FIRM_ORDER_ DELIVERY_DATE"message (see Column 406) to LSAT 102. As indicated by Column 412, steps 4, 5, 7, 8, and 9 must be completed before this step becomes a current step in the Workflow.

It is noted that a detailed description of the remaining Work Steps shown in 1647 Table 400, is not explicitly included herein, as their meaning should now be apparent in light of the above discussion and FIGS. 3 and 4.

Database Example

Figure 5:
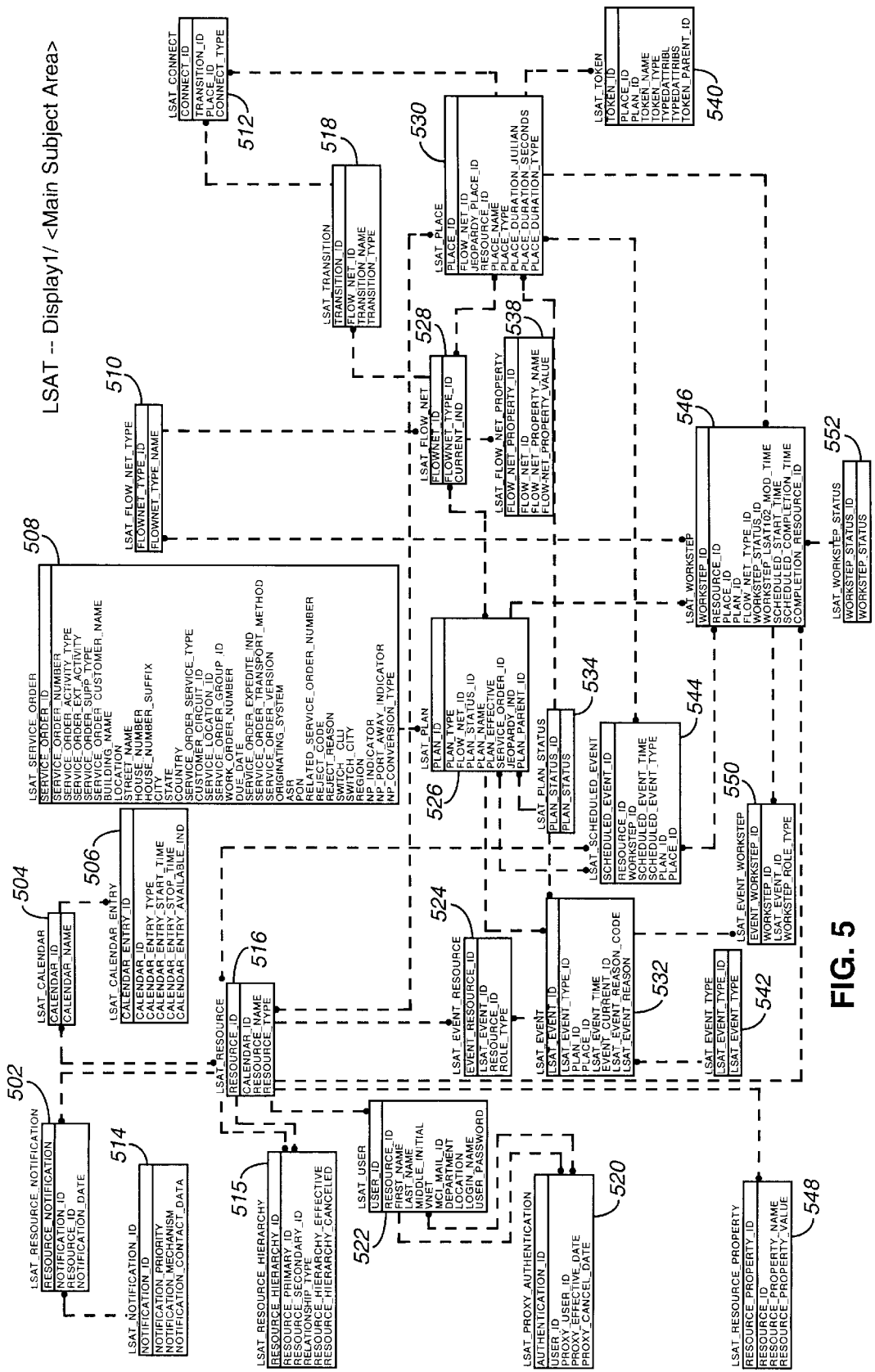
FIG. 5 is a block diagram depicting an example of database tables and their relationships that can be used in a preferred embodiment of the present invention.

FIG. 5 is a block diagram illustrating a plurality of database tables that can be used to implement the database 104, according to a preferred embodiment of the present invention. In this example of a preferred embodiment, a relational database is used to implement the database 104. However, in other embodiments, different types of databases can be used. The block diagram depicted in FIG. 5 shows specific database tables, database table fields, and relationships between database tables and/or fields, according to a preferred embodiment of the present invention.

Table 2 contains a list of each of the database tables depicted in the example database implementation as shown in FIG. 5. In addition, Table 2 contains the name and description of each field within the database tables shown in the example embodiment in FIG. 5. Note that the names of the fields listed below are generally descriptive of the type of information stored therein, according to a preferred embodiment of the present invention. Thus, based on the description and the names provided in the table below, the use of these fields would be apparent to persons skilled in the relevant art(s). As such, a detailed description of each of these fields is not provided herein.

It is important to note that the block diagram shown in FIG. 5, and the information provided in the Table below, depicts an example of specific database tables and their associated fields that can be used in a preferred embodiment of the present invention. Many variations of different database tables and/or fields can be used in alternate embodiments of the present invention. Such variations would be apparent to persons skilled in the relevant arts, after reading examples presented herein.

TABLE 2

Database tables and fields.

| Table/Field Name | Ref. No. (FIG. 5) | Description |
|---|---|---|
| Calendar | 504 | |
| Calendar_Id | | Internal Sequence Id |
| Calendar_Name | | Represents a freeform name for this calendar |
| Calendar_Entry | 506 | |
| Calendar_Entry Id | | Internal Sequence Id |
| Calendar_Id | | Link to the calendar this entry is part of |
| Calendar_Entry_Type | | Type of entry |
| Calendar_Entry_Start_Time | | Time this entry begins |
| Calendar_Entry_Stop_Time | | Time this entry stops |
| Calendar_Entry_Available_Ind | | Indicates if this entry indicates availability or non-availability |
| Connect | 512 | |
| Connect_Id | | Internal Sequence Id |
| Transition_Id | | Link to transition for this connection |
| Place_Id | | Link to place for this connection |
| Connect_Type | | Input or Output Direction |
| Event_Workstep | 550 | |
| Event_Workstep_Id | | InternalSequenceId |
| Workstep_Id | | Link to the workstep |
| LSAT_Event_Id | | Link to the event |
| Workstep_Role_Type | | Indicates the relation between the workstep and event |
| Event_Resource | 524 | |
| Event_Resource Id | | InternalSequenceId |
| LSAT_Event_Id | | Link to the event |
| Resource_Id | | Link to the resource |
| Role_Type | | Indicates the relation between the resource and event |
| Event | 532 | |

TABLE 2-continued

Database tables and fields.

| Table/Field Name | Ref. No. (FIG. 5) | Description |
|---|---|---|
| LSAT_Event_Id | | Internal Sequence Id |
| LSAT_Event Type_Id | | Type of event, normalized into a lookup table |
| Plan_Id | | Link to the plan (if any) associated with this event |
| Place_Id | | Link to the place (if any) associated with this event |
| LSAT_Event_Time | | Time of the occurrence |
| Event_Current_Id | | Is this event currently happening |
| LSAT_Event_Reason_Code | | Freeform long value to represent a user entered code for the event |
| LSAT_Event_Reason | | Freeform string value to |
| Event_Type | 542 | |
| LSAT_Event_Type Id | | Internal Sequence Id |
| LSAT_Event_Type | | Type of event |
| Flow_Net | 528 | |
| Flownet_Id | | Link to the floNet that has this name, value property |
| Flownet_Type_Id | | Internal Sequence Id |
| Current_Ind | | Name |
| Flow Net Type | 510 | |
| Flownet_Type_Id | | Internal Sequence Id |
| Flownet_Type_Name | | Unique way to describe a kind of flow |
| Flow_Net_Property | 538 | |
| Flow_Net_Property _Id | | Internal Sequence Id |
| Flownet_Id | | Link to the flowNet that has this name, value property |
| Flow_Net_Property_Name | | Name of the property |
| Flow_Net_Property_Value | | Value of the property |
| Notification_Id | 514 | |
| Notification_Id | | Internal Sequence Id |
| Notification_Priority | | Priority this notification is to be used for |
| Notification_Mechanism | | Type of notification |
| Notification_Contact_Data | | Depending on the mechanism is used to contact the resource. May represent paging number or e-mail address |
| Place | 530 | |
| Place_Id | | Internal Sequence Id |
| Flownet_Id | | Link to the flownet that contains this place |
| Jeopardy_Place_Id | | Link to the Place that should be jumped to if a jeopardy exists (only used in phase 1 to indicate presence of jeopardy) |
| Resource_Id | | Resource which is the starting point for scheduling of this step |
| Place_Name | | Unique name within this |
| Place_Type | | Kind of activity |
| Place_Duration Julian | | Duration to be used for scheduling this place, broken up into Julian, Second format |

TABLE 2-continued

Database tables and fields.

| Table/Field Name | Ref. No. (FIG. 5) | Description |
|---|---|---|
| Place_Duration Seconds | | Duration to be used for scheduling this place, broken up into Julian, Second format |
| Place_Duration Type | | Duration Type: BusinessDays, // working days CalendarDays, // exact days AtTime // time of day ExactTime, // add time |
| Plan | 526 | |
| Plan_ID | | Internal Sequence_Id |
| Plan_Type | | ASR, LocalServiceOrder or LocakServiceGroup |
| Flownet_Id | | Link to the floNet that has this name, value property |
| Plan_Status_Id | | Enumerated Value for the status of the plan (PENDING, SCHEDULED, etc . . . ) |
| Plan_Name | | Internal Name for the plan - Unused currently |
| Plan_Effective | | Added date to indicate when the plan was created |
| Service_Order_ID | | Link to ServiceOrder that represents this plan or the first ServiceOrder in the group |
| Jeopardy_IND | | Indicate if any current jeopardies are active on this plan |
| Plan_Parent_ID | | Link to the parent plan (if any) |
| Plan Status | 534 | |
| Plan_Status_Id | | InternalId |
| Plan_Status | | PENDING, SCHEDULED, . . . |
| Proxy_Authentication | 520 | |
| Authentication_Id | | Internal sequence Id |
| User_Id | | Link to user, we are authorizing through |
| Proxy_User_Id | | Link to user we are authorized to become |
| Proxy_Effective_Date | | Date the proxy became effective |
| Proxy_Cancel_Date | | Date the proxy was canceled |
| Resource | 516 | |
| Resource_Id | | Internal Sequence Id |
| Calendar_Id | | Link to calendar this resource is scheduled against |
| Resource_Name | | Unique name for this resource |
| Resource_Type | | Type of resource |
| Resource_Hierarchy | 515 | |
| Resource_Hierarchy_Id | | Internal SequenceId |
| Resource_Primary_Id | | Link to primary(parent) in relationship |
| Resource_Secondary_Id | | Link to secondary(child) in relationship |
| Relationship_Type | | Represents the kind of relationship |
| Resource_Hierarchy_Effective | | Date the Resource became effective |
| Resource_Hierarchy_Canceled | | Date the Resource was canceled |
| Resource Notification | 502 | |
| Resource_Notification Notification_Id | | InternalSequenceId Link to the notification manner |
| Resource_Id | | Link to the resource |
| Notification_Date | | Date this notification was assigned to the resource |
| Resource_Property | 548 | |
| Resource_Property_Id | | Internal Sequence Id |
| Resource_Id | | Link to the flowNet that has this name, value property |
| Resource_Property_Name | | Name of the property |
| Resource_Property_Value | | Value of the property |
| Scheduled Event | 544 | |
| Scheduled Event_Id | | Internal Sequence Id |
| Resource_Id | | Link to the Resource |
| Workstep_Id | | Link to the workstep the resource is scheduled for |
| Scheduled_Event_Time | | Time that the scheduling is made |
| Scheduled_Event_Type | | Type of scheduling |
| Plan_Id | | The plan that is associated with this event if any |
| Place_Id | | The place that this event is tied to |
| Service_Order | 508 | |
| Service_Order_Id | | Link to ServiceOrder that represents this plan or the first ServiceOrder in this group |
| Service_Order_Number | | Indicates the ID of service order globally |
| Service_Order_Activity_Type | | Indicates the activity type of service orders such as ADD,. DISCONNECT, etc. |
| Service_Order_Ext_Activity | | Indicates the extended activity of service orders such as NEW_INSTALL_ ADD, INSIDE_ MOVE, etc. |
| Service_Order_Supp_Type | | Indicates the supplemental type of the service orders, such as CANCEL, DUE_DATE_ CHANGE, etc. |
| Service_Order_Customer_Name | | Indicates the customer name of service orders |
| Building_Name | | Indicates the building name of service orders |
| Location | | Indicates the location of service orders |
| Street_Name | | Indicates the street name of service orders |
| House_Number | | Indicates the house number of service orders |
| House_Number_Suffix | | Indiates the house suffix of service orders |
| City | | Indicates the city of service orders |
| State | | Indicates the state of |

TABLE 2-continued

Database tables and fields.

| Table/Field Name | Ref. No. (FIG. 5) | Description |
|---|---|---|
| Country | | service orders Indicates the country of service orders |
| Service_Order_Service_Category | | Indicates the service category of service orders such as LOCAL, SPECIAL, |
| Service_Order_Service_Type | | Indicates the service type of service orders such as LOCAL_LINE, DS1, etc. |
| Customer_Circuit_Id | | Indicates the customer circuit ID of service orders |
| Service_Location_Id | | Indicates the service location ID of service orders |
| Service_Order_Group_Id | | Internal LSAT grouping mechanism to link related Service Orders by criteria discussed in Design Documentation |
| Work_Order_Number | | Relates a group of service orders |
| Due_Date | | Indicates the due date of service orders |
| Service_Order_Expedite_Ind | | Indicates the expedite indicates of service orders |
| Service_Order_Transport_Method | | Indicates transport method of service roders such as ON_NET LOCAL_DIRECT, etc. |
| Service_Order_Version | | >1 if supp |
| Originating_System | | ARMS or MACD |
| ASR | | Access Service Request |
| PON | | Purchase Order Number |
| Related_Service_Order_Number | | Freeform indicator of a related Service Order Number |
| Reject_Code | | Freeform indicate of the LAST reject code or 0 if success |
| Reject_Reason | | Freeform comment indicates the reason for a reject or blank if necessary |
| Switch CLLI | | Newly added string |
| Switch_City | | Newly added string |
| Region | | Region of order |
| NP_Indicator | | Is this an NP order |
| NP_Port_Away_Indicator | | Is this order ported away |
| NP_Conversion_Type, | | What kind of conversion |
| Token | 540 | |
| Token_Id | | Internal Sequence Id |
| Place_Id | | Link to the current location of this token |
| Plan_Id | | Link to the plan(if any containing this token) |
| Token_Name | | Internal Name for the token |
| Token_Type | | Used to represent token type |
| TypeAttribl | | Used to store internal construction information |
| TypeAttribs | | Used to store internal construction information |
| Token_Parent_Id | | Link to the parent Token of this token (if any) |
| Transition | 518 | |
| Transition_Id | | Internal Sequence Id |
| Flownet_Id | | Link to the flowNet that this transition is part of |
| Transition_Name | | Freeform Name for the transition, unused |
| Transition_Type | | Type of transition rules to apply |
| User | 522 | |
| User_Id | | Internal Sequence Id |
| Resource_Id | | Link to resource if any this user represents |
| First_Name | | User's First name if any |
| Last_Name | | User's Last name if any |
| Middle_Initial | | User's Middle initial |
| Vnet | | User's phone v-net |
| Mci_Mail_Id | | User's_mail ID |
| Department | | User's department |
| Location | | User's organizational location |
| Login_Name | | Unique name used for login |
| User_Password | | String for validation of user |
| Workstep | 546 | |
| Workstep_Id | | Internal Sequence Id |
| Resource_Id | | Newly added Id |
| Place_Id | | Link to the place this workstep is scheduled against |
| Plan_Id | | Link to the place this workstep is scheduled against |
| Flow_Net_Type_Id | | Link to the flowNetType lookup table that the plan's flownet is for this workstep is |
| Workstep_Status_Id | | Indicates the status of this workstep (PENDING, CURRENT, RESPONDED, . . . ) Normalized into the WorkStepStatus Table |
| Workstep_LSAT 102_Mod_Time | | Time workstep is modified |
| Scheduled_Start_Time | | Time workstep is scheduled to begin |
| Scheduled_Completion_Time | | Time workstep is scheduled to end |
| Completion_Resource_Id | | Link to the resource (if any) that last completed this step |
| Workstep_Status | 552 | |
| Workstep_Status_Id | | Internal Sequence Id |
| Workstep_Status | | String representing workstep state |

System Access and Security

Access to LSAT 102 functionality is preferably gained through defined interfaces provided by the LSAT 102 system. Users access LSAT 102 information and functions through the LSAT web interface at 120. Other computer systems 106–114 communicate across interfaces defined specifically for each system through messaging.

Preferably, LSAT 102 protects the system from unauthorized access by password protection. User accounts require a valid combination of a user name and a password through a log-in procedure. Users can typically change their passwords at will and should change them periodically in accordance with Company standards.

table 3 lists the security levels provided by a preferred embodiment of the present invention. In addition, the corresponding functionality permitted to users under each access level is listed. Menu selections provided by the LSAT web interface would reflect only those options available to a user at the security level in effect for that session.

TABLE 3

Security Level Functionality Available

| Security Level | Functionality Available |
| --- | --- |
| GUEST | LSAT 102 shall grant Users with Guest access the security privilege to:<br>• register as a User in an Organizational Group<br>• obtain status of any active Service Order<br>• perform searches on the system |
| Resource | Access the same security privilege of a Guest plus:<br>• view and complete assigned WSs in their own In-Box<br>• assign a Jeopardy state to a SO in their own In-Box<br>• perform custom queries on the data in their own In-Box |
| POWER | Access the same security privilege of a Resource plus:<br>• view and complete assigned WSs in the In-Box of any user in the same Organizational Group<br>• perform custom queries against any In-Box in the same Organizational Group<br>• display all SOS in a Jeopardy state, from any Organizational Group |
| SUPERVISOR1 | Access the same security privilege of a Power Resource plus:<br>• view the In-Box of a user in any other Organizational Group<br>• reroute WSs assignments to any Resource in the same Organizational Group<br>• perform Custom Queries against all active orders in LSAT 102 |
| SUPERVISOR2 | Access the same security privilege of a Supervisor 1 plus<br>• reroute WSs assignments to any other Organizational Group or Resource |
| ADMINISTRATOR | Access the same security privilege of Supervisor 1 plus:<br>• set or modify the security level for any user in the same Organizational Group with a lower security privilege<br>• set or modify the scheduling properties for any user in the same Organizational Group with a lower security privilege<br>• set or modify the work allocation strategy for their own Organizational Group<br>set or modify the default screen for any user in the same Organizational Group with a lower security privilege<br>• attach and detach any user in their own Organizational Group<br>• set or modify the SO Access level for any user in the same Organizational Group |
| SUPERADMINISTRATOR | Access the security privilege of all lower security levels plus:<br>• Set or modify administrative functions for any and all Organizational Groups |

Typically, in addition to the functional restrictions imposed by the security level of access, users are further restricted by the Service Order information they are permitted to view.

Unregistered individuals are permitted to use LSAT 102 with the lowest possible security level, namely, GUEST access. Each user account has a default display screen associated with it. Upon successful completion of a log-in sequence, this default screen is displayed on the terminal by the LSAT web interface.

The default screen for GUEST access users is a Work Order search screen. For all other security access levels, the initial default screen is the In-Box associated with the user account. Preferably, however, a user with a security access level other than GUEST access, may set the default screen to any of the following screens authorized for the security access level assigned to that account:

Individual in-box;

Organizational group in-box;

Custom query; and

Work Order search.

History Tracking

Preferably, LSAT 102 maintains a History File of the significant events that occur within the system as it pertains to each Service Order. These events include transaction processing activities, system access information, and administrative manipulation of system data. All data is recorded in a manner that supports reporting.

As LSAT 102 tracks each Service Order through the lifecycle, it maintains a historical record of each Work Step completed and other important actions taken. History File data for Work Steps include actual step completion times as well as planned start and finish times. This information permits the comparison of standard intervals defined for a Work Plan with actual completion data enabling the fine tuning of Workflow intervals. The data recorded preferably includes details pertaining to the following:

Every Work Step scheduled;

Each manual Work Step reassignment;

Each Supplemental Order;

Each Work Step placed in a Jeopardy state;

Each Jeopardy state notification;

When a Jeopardy state has been cleared and the amount of time that the Work Step was in the Jeopardy state;

Hard Rejections;

Rework Step;

Every change in the status of a Work Step;

Each Work Step completed;

Each Work Plan (Service Order) completed;

Each Work Order completed; and

Each backdated completion date.

In order to minimize storage overhead, History File data is preferably archived when it is no longer likely to be needed. For example, in one embodiment Work Orders are archived after 180 days after completion of the last Service Order in the Work Order. Service Orders and non-order related events are archived 180 days after completion of the order or occurrence of the event. Archived data may still be accessed and reports may still be generated on this data.

Reporting

Because LSAT 102 collects large quantities of detailed Workflow information. This information is available for transfer to another system reporting purposes. In addition, data collected by LSAT 102 is also available for custom queries via the LSAT web interface for immediate review on line In-Boxes In-Boxes are employed to communicate information about Service Orders to the Resources assigned to process them and the Organizational Group management of the assigned Resources. When a Work Plan is implemented for a Service Order, LSAT 102 uses scheduling and Resource allocation algorithms to coordinate and assign the Work Steps necessary to process the Service Order. The In-Box is a logical container where the Work Steps assigned to a Resource are deposited and provides a convenient means of viewing the workload of that Resource or of the entire Organizational Group.

LSAT 102 preferably displays the Service Orders in an In-Box by priority and within priority by order of receipt (i.e. first-in/first-out(FIFO)). Jeopardy Orders are typically considered to be the highest priority and are therefor displayed first. Jeopardy Orders are typically followed by Expedite Orders. Normal orders are typically displayed last Jeopardy Orders and Expedite Orders are noted as such and displayed with different and distinctively colored highlights to draw attention to these special order categories. LSAT 102 preferably provides the following three views for information contained in an individual Resource In-Box:

Current. This is the default view and displays the Service Orders having Work Steps that the individual needs to address and is able to process.

Current and Pending. In addition to displaying the Service Orders in the Current view, this view also displays Service Orders having Work Steps assigned to the individual but requiring processing by another Resource before becoming accessible to the individual.

Jeopardy. This view displays only those orders currently in a Jeopardy state.

Since a number of the users involved in the Service Order business process either travel frequently or move around within their work site, LSAT 102 stores Service Order status information in a manner which allows users to have access to their In-Boxes from any authorized station in any office within the Company.

Work Orders

Generally, LSAT 102 reports on orders at the Service Order level. However, users also have the ability to query the system on a variety of data elements, including: customer name; date; city; and state information. There may also be different types of information available to different users as well. For example, in one embodiment, LSC's can login to LSAT 102 and select their service state, which will display a list of cities. By selecting a city, LSAT 102 displays a list of customer's within that city. Alternatively, by selecting a customer, LSAT 102 l displays the list of Service Orders that are in process or pending for that specific customer. Accordingly, the present invention provides an easy-to-use "drill-down" method that follows a logical progression to the information required.

Management

Preferably, LSAT 102 provides a robust query interface for producing reports viewable on line. In this manner, a user can search on the most common data elements and retrieve information about Service Orders. This allows a user to search for a specific order, or a block of like-orders that exist in the LSAT 102 database. Note that LSAT 102 typically retains Service Order data for 180 Days. After that time, users generally need to refer requests for reports to the archive database system used in an embodiment of the present invention.

Exemplary Computer System

Figure 6:
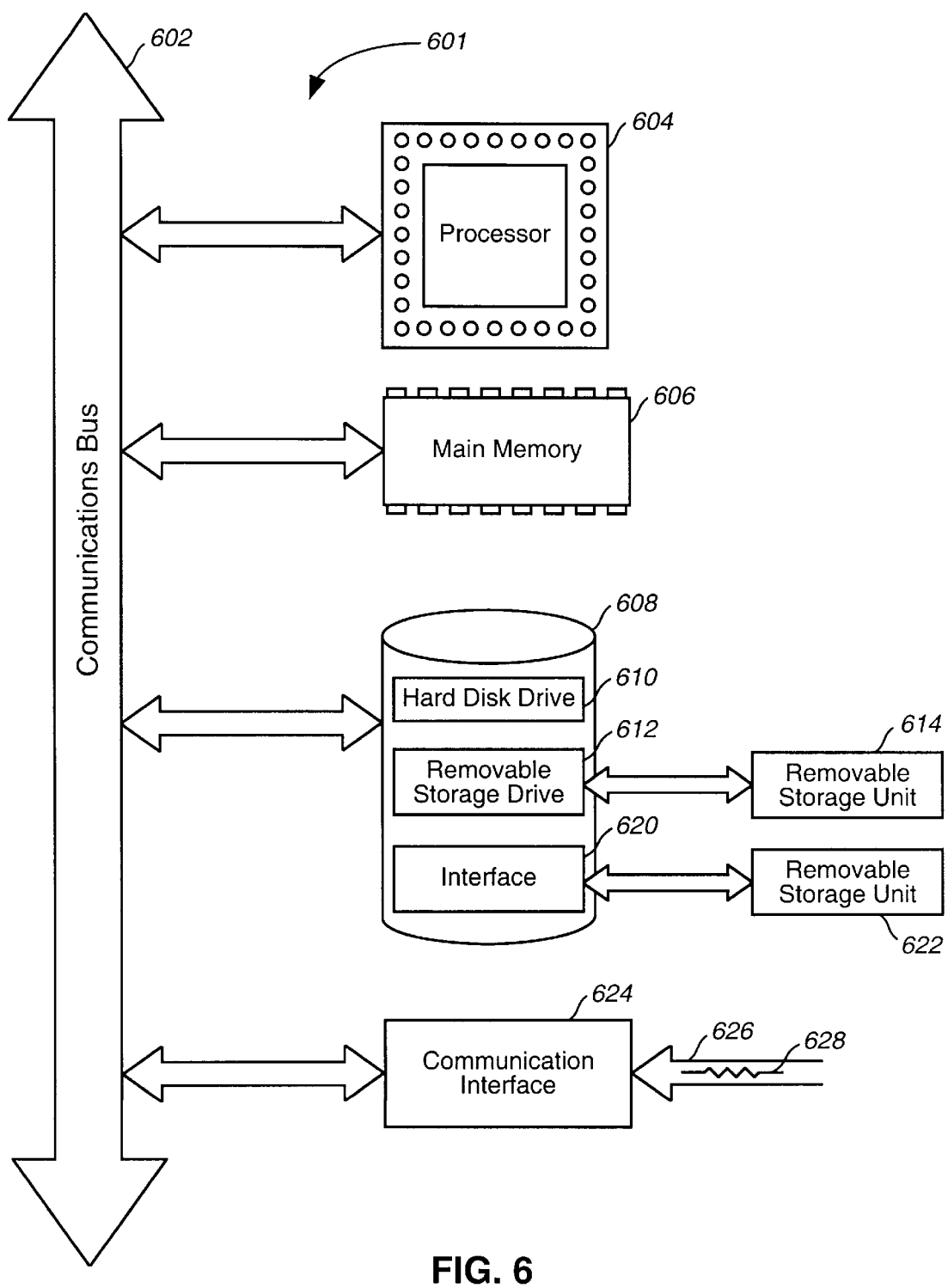
FIG. 6 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 601 is shown in FIG. 6. The computer system 601 includes one or more processors, such as processor 604. The processor 604 is connected to a communication bus 602. Various software embodiments are described in terms of this example computer system. After reading this description, it will become apparent to a person skilled in the relevant art how to implement the invention using other computer systems and/or computer architectures.

Computer system 602 also includes a main memory 606, preferably random access memory (RAM), and can also include a secondary memory 608. The secondary memory 608 can include, for example, a hard disk drive 610 and/or a removable storage drive 612, representing a floppy disk drive, a magnetic tape drive, an optical disk drive, etc. The removable storage drive 612 reads from and/or writes to a removable storage unit 614 in a well known manner. Removable storage unit 614, represents a floppy disk, magnetic tape, optical disk, etc. which is read by and written to by removable storage drive 612. As will be appreciated, the removable storage unit 614 includes a computer usable storage medium having stored therein computer software and/or data.

In alternative embodiments, secondary memory 608 may include other similar means for allowing computer programs or other instructions to be loaded into computer system 601. Such means can include, for example, a removable storage unit 622 and an interface 620. Examples of such can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 601.

Computer system 601 can also include a communications interface 624. Communications interface 624 allows software and data to be transferred between computer system 601 and external devices. Examples of communications interface 624 can include a modem, a network interface (such as an Ethernet card), a communications port, a PCM-CIA slot and card, etc. Software and data transferred via communications interface 624 are in the form of signals which can be electronic, electromagnetic, optical or other signals capable of being received by communications interface 624. These signals 626 are provided to communications interface via a channel 628. This channel 628 carries signals 626 and can be implemented using wire or cable, fiber optics, a phone line, a cellular phone link, an RF link and other communications channels.

In this document, the terms "computer program medium" and "computer usable medium" are used to generally refer to media such as removable storage device 612, a hard disk installed in hard disk drive 610, and signals 626. These computer program products are means for providing software to computer system 601.

Computer programs (also called computer control logic) are stored in main memory and/or secondary memory 608. Computer programs can also be received via communications interface 624. Such computer programs, when executed, enable the computer system 601 to perform the features of the present invention as discussed herein. In particular, the computer programs, when executed, enable the processor 604 to perform the features of the present invention. Accordingly, such computer programs represent controllers of the computer system 601.

In an embodiment where the invention is implemented using software, the software may be stored in a computer program product and loaded into computer system 601 using removable storage drive 612, hard drive 610 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for managing the workflow to process a service order among a variety of organizations within a telecommunications company, the method comprising the steps of:

receiving an order message from an originating computer system, said order message pertaining to said service order and containing order information from the service order;

selecting, based at least in part on the order information, a work plan from a database comprising a plurality of work plans, the work plan comprising a plurality of workflow steps;

determining a current workflow step from the plurality of workflow steps;

assigning a particular computer system associated with the current workflow step;

sending a notification message to the particular computer system to begin activities associated with the current workflow step;

retrieving a status message from the particular computer system to determine whether the current workflow step is complete; and repeating said steps of determining, identifying, sending, and retrieving until all of the workflow steps are complete.

2. The method of claim 1, wherein said retrieving step is used to additionally determine whether the current workflow step is rejected, and the method further comprises the step of:

sending a reject message back to originating computer system indicating that the service order has been rejected, if the status indicates that the current workflow step is rejected; and said step of repeating terminates if the status indicates that a current workflow step is rejected.

3. The method of claim 1, wherein each of the plurality of workflow steps includes an indication describing any prerequisite workflow steps.

4. The method of claim 1, wherein said step of retrieving comprises the step of monitoring the particular computer system to determine the status of the current workflow step.

5. The method of claim 1, wherein said step of retrieving comprises the step of receiving a message from the particular computer system indicating the status of the current workflow step.

6. The method of claim 1, wherein said step of assigning a particular computer system, further includes the step of assigning a particular resource to process the current workflow step, said particular resource is identified according to a predefined resource hierarchy stored in the database.

7. The method of claim 1, wherein said step of selecting a work plan includes determining from the service order, the value for one or more variables from the set of: a service category, a service type, a transport method, an activity type and an extended activity type.

8. The method of claim 1 further comprising the step of establishing a common messaging system protocol for transporting the order, status and notification messages.

9. The method of claim 1, wherein said step of scheduling is accomplished using calendar data, and event duration data, from the database.

10. The method of claim 6, wherein said resource is a group, individual or computer system.

11. A system for managing the workflow for processing a service order among a variety of organizations within a telecommunications company, said system comprising:

a workflow management server;

a plurality of computer systems, coupled to said workflow management server via bi-directional communications links;

first means for communicating over said bi-directional communications links for sending a service order to said workflow management server;

means for selecting a work plan associated with said service order, said work plan comprising a plurality of workflow steps, said work plan selected based at least in part on information contained in said service order;

means for determining a current workflow step from said work plan;

means for assigning a resource for said current workflow step;

second means for communicating over said bi-directional communication links, for sending a notification message to one of said plurality of computer systems to notify said resource to begin activities associated with said current workflow step; and third means for communicating over said bi-directional communications links for receiving a status for said current workflow step.

12. The system of claim 11, further comprising a database management system coupled to said workflow management server for storing a plurality of work plans.

13. The system of claim 11, wherein said first, second and third communication means is includes a messaging protocol that is compatible with said plurality of computer systems.

14. The system of claim 11, wherein said selecting means includes applying predetermined logic to information from said service order.

15. The system of claim 12, wherein said means for assigning includes means for reading resource hierarchy data from with said database.

16. A method for managing the workflow to process and track a service order in a telecommunications company, the method comprising the steps of:

receiving a notification message from an originating computer system, the notification message pertaining to said service order and containing order information from the service order;

selecting, based at least in part on the order information, a work plan from a database comprising a plurality of work plans, the work plan comprising a plurality of workflow steps;

scheduling each of said plurality of workflow steps with a start time and a fixed duration time;

assigning a particular resource to each of said plurality of workflow steps;

determining a current workflow step from the plurality of workflow steps;

placing each of said plurality of workflow steps in an in-box associated with the particular resource;

identifying the current workflow step, as current, in the in-box associated with the current workflow step;

notifying the particular resource about the current workflow step by sending a message to a computer system associated with the current workflow step; and retrieving a workflow step status indicating a status for the current workflow step.

17. The method of claim 16, further comprising the step of:

sending a message to the originating system to reprocess the service order, if the workflow step status indicates that the current workflow step has been rejected.

18. The method of claim 16, further comprising the steps of:

logging-on to one of a plurality of remote workstations; and viewing the contents of the in-box via a browser based user interface.

19. The method of claim 17, wherein each of the plurality of workflow steps includes an indication of any prerequisite workflow steps.

20. The method of claim 17, wherein said step of retrieving comprises the step of monitoring the computer system to determine the workflow step status.

21. The method of claim 17, wherein said step of retrieving comprises the step of receiving an acknowledgment from the computer system indicating the workflow step status.

22. The method of claim 17, wherein said step of retrieving comprises the step of accepting status from a user at a web based user interface.

23. The method of claim 18, further comprising the step of providing a database query for accessing selectable information pertaining to a particular service order.

24. The method of claim 23, wherein the information includes any of the workflow steps associated with the particular service order.

25. The method of claim 23, wherein the information includes workflow steps that have not been completed.

26. The method of claim 23, wherein the information includes workflow steps that have missed a jeopardy point.

27. The method of claim 26, wherein the information includes resource information pertaining to a missed jeopardy point.

28. A system for managing the workflow for processing and tracking a service order for a telecommunications company, said system comprising:

a workflow management server;

a database management system coupled to said workflow management server for storing a work plan comprising a plurality of workflow steps and other information pertaining to processing and tracking the service order, the work plan selected based at least in part on information contained within the service order;

a plurality of computer systems, coupled to said workflow management server, said plurality of computer system being used to process the service order according to workflow control messages sent from said workflow management server in accordance with said work plan;

a computer network coupled to said workflow management server; and a plurality of workstations, coupled to said computer network, for interacting with said work plan.

29. The system of claim 28, wherein said interacting with said work plan includes:

viewing means coupled to said plurality of workstations for selectively viewing information pertaining to the service order.

30. The system of claim 28, wherein said interacting with said work plan includes:

responding means coupled to said plurality of workstations for inputting a status for said workflow steps, said status indicating whether one of said workflow steps has been completed.

31. The system of claim 29, wherein said information includes workflow steps associated with the service order.

32. The system of claim 29, wherein said information includes workflow steps that have not been completed.

33. The system of claim 29, wherein said information includes workflow steps that have missed a jeopardy point.

34. The system of claim 29, wherein said information includes resource information pertaining to a missed jeopardy point.

* * * * *